(12) United States Patent
Nagase et al.

(10) Patent No.: US 8,613,509 B2
(45) Date of Patent: Dec. 24, 2013

(54) INK JET RECORDING INK COMPOSITION

(75) Inventors: Makoto Nagase, Shiojiri (JP); Masahiro Yatake, Shiojiri (JP)

(73) Assignee: Seiko Epson Corporation (JP)

( * ) Notice: Subject to any disclaimer, the term of this patent is extended or adjusted under 35 U.S.C. 154(b) by 302 days.

(21) Appl. No.: 13/115,152

(22) Filed: May 25, 2011

(65) Prior Publication Data

US 2011/0292113 A1 Dec. 1, 2011

(30) Foreign Application Priority Data

May 28, 2010 (JP) ................. 2010-122247
May 28, 2010 (JP) ................. 2010-122257
May 28, 2010 (JP) ................. 2010-122260
May 28, 2010 (JP) ................. 2010-122263

(51) Int. Cl.
*B41J 2/01* (2006.01)

(52) U.S. Cl.
USPC .................... 347/100; 347/95; 106/31.6

(58) Field of Classification Search
USPC .......... 347/100, 95, 96, 102, 101, 88, 99, 21, 347/20, 9; 106/31.6, 31.13, 31.27; 523/160, 523/161
See application file for complete search history.

(56) References Cited

U.S. PATENT DOCUMENTS

| | | | |
|---|---|---|---|
| 5,156,675 A | | 10/1992 | Breton et al. |
| 5,180,425 A * | | 1/1993 | Matrick et al. ............ 347/100 |
| 5,183,502 A | | 2/1993 | Meichsnër et al. |
| 5,196,056 A | | 3/1993 | Prasad |
| 5,356,464 A * | | 10/1994 | Hickman et al. ............ 347/100 |
| 2005/0215663 A1 | | 9/2005 | Berge et al. |
| 2007/0148460 A1 * | | 6/2007 | Licht et al. .................. 428/403 |
| 2009/0227701 A1 * | | 9/2009 | Kruger et al. ............... 522/174 |

FOREIGN PATENT DOCUMENTS

| | | |
|---|---|---|
| EP | 1 454 968 A1 | 9/2004 |
| EP | 1 624 033 A2 | 2/2006 |
| JP | 2007-522285 A | 1/2007 |
| WO | 2005/058992 A1 | 6/2005 |
| WO | 2005-071026 A | 8/2005 |
| WO | 2005071026 A1 | 8/2005 |
| WO | 2006/018152 A1 | 2/2006 |
| WO | 2009/076386 A1 | 6/2009 |
| WO | 2009/143433 A1 | 11/2009 |

* cited by examiner

*Primary Examiner* — Manish S Shah
(74) *Attorney, Agent, or Firm* — Harness, Dickey & Pierce, P.L.C.

(57) ABSTRACT

An Ink jet recording ink composition contains a dispersion containing a pigment dispersible in water therein and having an average particle size in the range of 20 to 300 nm, water, and a polyurethane resin containing a compound expressed by formula (I) and/or a compound expressed by formula (II):

$$HO-(CH_2CH_2O)_N-H \qquad (I)$$

where N represents an integer in the range of 1 to 6.

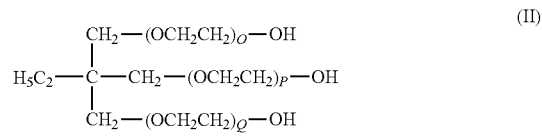

(II)

where O+P+Q is an integer in the range of 0 to 6.

12 Claims, No Drawings

INK JET RECORDING INK COMPOSITION

Priority is claimed under 35 U.S.C. §119 to Japanese Application No. 2010-122247 filed on May 28, 2010, Japanese Application No. 2010-122257 filed on May 28, 2010, Japanese Application No. 2010-122260 filed on May 28, 2010 and Japanese Application No. 2010-122263 filed on May 28, 2010 which is hereby incorporated by reference in its entirety.

BACKGROUND

1. Technical Field

The present invention relates to an ink jet recording ink composition, and more particularly, to an ink jet recording ink composition superior in rub fastness, dry cleaning resistance, and ejection stability.

2. Related Art

Pigments are often used as coloring agents for ink jet recording ink because of their superior fastness to, for example, water and light. Typically, pigments have low solubilities. In order to enhance the dispersion stability of a pigment in an ink, a dispersant, such as a surfactant or a polymer, is added to the ink. Resins having both a hydrophilic portion and a hydrophobic portion, such as styrene-acrylic copolymers, are generally used as the dispersant.

For ink jet recording, high printing properties are required of ink jet recording ink. For example, it is required not to cause bleeding, to dry rapidly, to be printed uniformly on various types of recording medium, and not to cause color mixing between adjacent printed images. In order to enhance these printing properties, in general, various additives are added to the ink. For example, in order to enhance the penetration in recording media and thus to reduce the bleeding, a glycol ether, such as diethylene glycol monobutyl ether, may be added (U.S. Pat. No. 5,156,675), or an acetylene glycol surfactant may be added (U.S. Pat. No. 5,183,502). In U.S. Pat. No. 5,196,056, both of them are added.

However, if a surfactant or a glycol ether is present in an ink containing a pigment dispersant, the pigment is liable to adsorb or separate the dispersant resin, thereby degrading the storage stability of the ink. In addition, if the dispersant separated from the pigment remains in the ink, the viscosity of the ink may be increased to degrade the ink ejection stability.

JP-T-2007-522285 discloses an ink jet ink composition containing a crosslinked polyurethane dispersion and exhibiting improved washing fastness on a textile printed by an ink jet method therewith. On the other hand, an ink jet ink composition exhibiting high stability and fixability has been being desired, particularly for textile use.

SUMMARY

The present inventors have found that an ink jet recording ink composition, particularly suitable in textile use, having high not only rub fastness and dry cleaning resistance, but also high ejection stability can be achieved by adding a specific resin to an ink composition containing a specific pigment dispersion. Thus, the invention has been achieved.

Accordingly, an advantage of some aspects of the invention is that it provides an ink jet recording ink composition having high rub fastness and dry cleaning resistance and high ejection stability.

According to an aspect of the invention, an ink jet recording ink composition is provided which contains a dispersion containing a pigment dispersible in water therein, water, and a polyurethane resin. The dispersion has a particle size in the range of 20 to 300 nm. The polyurethane resin contains at least one of the compounds expressed by the following formulas (I) and (II):

where N represents an integer in the range of 1 to 6.

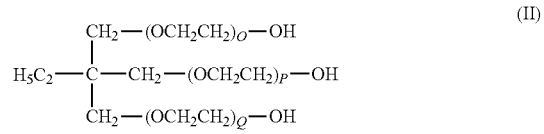

where O+P+Q is an integer in the range of 0 to 6.

The ink jet recording ink composition of an embodiment of the invention exhibits high ejection stability as well as high rub fastness and dry cleaning resistance, particularly, in textile use.

DESCRIPTION OF EXEMPLARY EMBODIMENTS

An ink jet recording ink composition of an embodiment of the invention contains a dispersion containing a pigment dispersible in water therein and having a particle size in the range of 20 to 300 nm, water, and a polyurethane resin containing at least one of the compounds expressed by formulas (I) and (II) shown above. The ink jet recording ink composition can be suitably used particularly for ink jet textile printing. The constituents in the ink jet recording ink composition will now be described.

Polyurethane Resin

The ink jet recording ink composition contains a polyurethane resin. The polyurethane resin contains at least one of the compounds expressed by formulas (I) and (II) shown above.

Preferably, the polyurethane resin contains a portion insoluble in THF in a proportion of 50% by mass or more. When the polyurethane resin contains 50% by mass or more of THF-insoluble portion, the resulting ink jet recording ink composition can be superior in rub fastness, dry cleaning resistance and ejection stability. The amount of the THF-insoluble portion of the polyurethane resin can be calculated from the following equation (A):

$$THF\text{-insoluble portion(mass \%)} = (a-b) \times 100/(c \times d/100) \qquad (A)$$

a: mass of centrifuge tube+mass of insoluble gel (g)
b: mass of centrifuge tube (g)
c: mass of resin dispersion (g)
d: solid content of resin dispersion (%)

More specifically, it will be described below how the amount of the THF-insoluble portion is determined. The mass of an empty centrifuge tube has been weighed in advance. This is the mass (b) of the centrifuge tube. The centrifuge tube is charged with 1 g (c) of resin dispersion having a known solid content (d) and 30 g of THF, followed by mixing at 25° C. Then, the mixed THF solution is subjected to centrifugation at 17,000 rpm for 2 hours, and the liquid phase is removed. The centrifuge tube, in which an insoluble gel remains at the bottom, is placed in an oven and dried at 110° C. for 2 hours. Then, the mass of the centrifuge tube is weighed again. Thus the sum (a) of the masses of the centrifuge tube and the insoluble gel is obtained.

Preferably, the compound expressed by formula (I) has an N in the range of 2 to 4. Formula (I) compounds satisfying having an N of 2 to 4 can further enhance the rub fastness, dry cleaning resistance and ejection stability of the ink jet recording ink composition.

Preferably, the compound expressed by formula (II) satisfies O+P+Q=0 to 3. Formula (II) compounds satisfying O+P+Q=0 to 3 can further enhance the rub fastness, dry cleaning resistance and ejection stability of the ink jet recording ink composition.

Polyisocyanate

The polyurethane resin in the ink composition of the present embodiment contains a polyisocyanate component. Polyisocyanates that can be used in the ink composition have at least two isocyanate groups. Examples of such a polyisocyanate include diethylene diisocyanate, tetramethylene diisocyanate, hexamethylene diisocyanate, trimethylhexamethylene diisocyanate, cyclohexane diisocyanate, 1,3-bis(isocyanatomethyl)cyclohexane, isophorone diisocyanate, 2,6-bis(isocyanatomethyl)decahydronaphthalene, lysine triisocyanate, 2,4-tolylene diisocyanate, 2,6-tolylene diisocyanate, o-tolidine diisocyanate, 4,4'-diphenylmethane diisocyanate, diphenyl ether diisocyanate, 3-(2'-isocyanatocyclohexyl)propyl isocyanate, tris(phenyl isocyanate) thiophosphate, isopropylidene bis(cyclohexyl isocyanate), 2,2'-bis(4-isocyanate enyl)propane, triphenylmethane triisocyanate, bis(diisocyanatotolyl)phenylmethane, 4,4',4''-triisocyanate-2,5-dimethoxyphenylamine, 3,3'-dimethoxybenzidine-4,4'-diisocyanate, 1,3-phenylene diisocyanate, 1,4-phenylene diisocyanate, 4,4'-diisocyanatobiphenyl, 4,4'-diisocyanato-3,3'-dimethylbiphenyl, dicyclohexylmethane-4,4'-diisocyanate, 1,1'-methylene bis(4-isocyanatobenzene), 1,1'-methylene bis(3-methyl-4-isocyanatobenzene), m-xylylene diisocyanate, p-xylylene diisocyanate, 1,3-bis(1-isocyanato-1-methylethyl)benzene, 1,4-bis(1-isocyanato-1-methylethyl)benzene, 1,3-bis((2-isocyanato-2-propyl)benzene, 2,6-bis(isocyanatomethyl)tetrahydrodicyclopentadiene, bis(isocyanatomethyl)dicyclopentadiene, bis(isocyanatomethyl)tetrahydrothiophene, bis(isocyanatomethyl)thiophene, 2,5-diisocyanatomethylnorbornene, bis(isocyanatomethyl)adamantane, 3,4-diisocyanatoselenophene, 2,6-diisocyanato-9-selenabicyclononane, bis(isocyanatomethyl)selenophane, 3,4-diisocyanato-2,5-diselenolane, dimer acid diisocyanate, 1,3,5-tri(1-isocyanatohexyl)isocyanuric acid, 2,5-diisocyanatomethyl-1,4-dithiane, 2,5-bis(isocyanatomethyl-4-isocyanato-2-thiabutyl)-1,4-dithiane, 2,5-bis(3-isocyanato-2-thiapropyl)1,4-dithiane, 1,3,5-triisocyanatocyclohexane, 1,3,5-tris(isocyanatomethyl)cyclohexane, bis(isocyanatomethylthio)methane, 1,5-diisocyanato-2-isocyanatomethyl-3-thiapentane, 1,2,3-tris(isocyanatoethylthio)propane, 1,2,3-(isocyanatomethylthio)propane, 1,1,6,6-tetrakis(isocyanatomethyl)-2,5-dithiahexane, 1,1,5,5-tetrakis(isocyanatomethyl)-2,4-dithiapentane, 1,2-bis(isocyanatomethylthio)ethane, and 1,5-diisocyanato-3-isocyanatomethyl-2,4-dithiapentane, and, in addition, dimers produced by a biuret type reaction of these polyisocyanates, and cyclized trimers of polyisocyanurates, and alcohol or thiol adducts of these polyisocyanates. Also, compounds prepared by converting at least part of the isocyanate group of a polyisocyanate to an isothiocyanate group may be used. These compounds may be used singly or in combination.

Preferably, the polyisocyanate component of the polyurethane resin is expressed by the following formula (III):

$$\text{OCN}-(CH_2)_L-\text{NCO} \qquad (III)$$

where L represents an integer in the range of 3 to 10.

Preferably, the compound expressed by formula (III) has an L of 4 to 7. Formula (III) compounds satisfying L=4 to 7 can further enhance the rub fastness, dry cleaning resistance and ejection stability of the ink jet recording ink composition.

Polyol

The polyurethane resin in the ink composition of the present embodiment contains a polyol component. Polyols are compounds having two hydroxyl groups. Exemplary polyols include linear aliphatic glycols, such as ethylene glycol, propylene glycol, 1,3-propanediol, 1,3-butanediol, 1,4-butanediol, 1,5-pentanediol, 1,2-pentanediol, 3-methyl-1,5-pentanediol, 1,6-hexanediol, 1,2-hexanediol, diethylene glycol, triethylene glycol, tetraethylene glycol, dipropylene glycol, tripropylene glycol, polyethylene glycol, polypropylene glycol, 1,8-octanediol, 1,2-octanediol, and 1,9-nonanediol; branched-chain aliphatic glycols, such as neopentyl glycol, 3-methyl-1,5-pentanediol, 2-methyl-1,3-propanediol, 2,2-dimethyl-1,3-propanediol, 2-butyl-2-ethyl-1,3-propanediol, 2,2-dibutyl-1,3-propanediol, and 2-methyl-1,8-octanediol; alicyclic glycols, such as 1,4-cyclohexanediol and 1,4-cyclohexanedimethanol; and polyfunctional glycols, such as glycerol, trimethylolethane, trimethylolpropane, tributylolpropane, pentaerythritol, and sorbitol. These polyols may be used singly or in combination.

Polyester polyols may also be used in the present embodiment. Polyester polyols can be prepared by known processes, such as dehydration condensation of a glycol or ether and a divalent carboxylic acid or carboxylic anhydride. For example, the following compounds can be used in the preparation of the polyester polyol that can be used for the ink composition of the present embodiment. The glycol may be saturated or unsaturated. Examples of the glycol include linear aliphatic glycols, such as ethylene glycol, propylene glycol, 1,3-propanediol, 1,3-butanediol, 1,4-butanediol, 1,5-pentanediol, 1,2-pentanediol, 3-methyl-1,5-pentanediol, 1,6-hexanediol, 1,2-hexanediol, diethylene glycol, triethylene glycol, tetraethylene glycol, dipropylene glycol, tripropylene glycol, polyethylene glycol, polypropylene glycol, 1,8-octanediol, 1,2-octanediol, and 1,9-nonanediol; branched-chain aliphatic glycols, such as neopentyl glycol, 3-methyl-1,5-pentanediol, 2-methyl-1,3-propanediol, 2,2-dimethyl-1,3-propanediol, 2-butyl-2-ethyl-1,3-propanediol, 2,2-dibutyl-1, 3-propanediol, and 2-methyl-1,8-octanediol; alicyclic glycols, such as 1,4-cyclohexanediol and 1,4-cyclohexanedimethanol; and polyfunctional glycols, such as glycerol, trimethylolethane, trimethylolpropane, tributylolpropane, pentaerythritol, and sorbitol.

Exemplary ethers include alkyl glycidyl ethers, such as n-butyl glycidyl ether and 2-ethylhexyl glycidyl ether; and monocarboxylic acid glycidyl esters, such as versatic acid glycidyl ester.

Exemplary divalent carboxylic acids and anhydrides include dibasic acids, such as adipic acid, maleic acid, fumaric acid, phthalic anhydride, isophthalic acid, terephthalic acid, succinic acid, oxalic acid, malonic acid, glutaric acid, pimelic acid, azelaic acid, sebacic acid, and suberic acid; anhydrides or dimer acids of these acids; and castor oil and its fatty acid. In addition to the polyester polyols produced by dehydration condensation of those compounds, polyester polyols produced by ring-opening polymerization of cyclic esters may be used.

For example, poly[3-methyl-1,5-pentanediol]-alt-(adipic acid)], which is produced by dehydration condensation of 3-methyl-1,5-pentanediol and adipic acid, can be available as Kuraray Polyol P2010 from Kuraray.

The polyester polyol may be a polycarbonate polyol. Polycarbonate polyols can be generally produced by demethanol condensation reaction of a polyhydric alcohol and dimethyl carbonate, dephenol condensation reaction of polyhydric alcohol and diphenyl carbonate, or de-ethylene glycol condensation reaction of polyhydric alcohol and ethylene carbonate. Polyhydric alcohols used in these reactions include saturated or unsaturated glycols, such as 1,6-hexanediol, diethylene glycol, triethylene glycol, propylene glycol, 1,3-butanediol, 1,4-butanediol, neopentyl glycol, pentanediol, 3-methyl-1,5-pentanediol, octanediol, 1,4-butynediol, dipropylene glycol, tripropylene glycol, and polytetramethylene ether glycol; and alicyclic glycols, such as 1,4-cyclohexane diglycol and 1,4-cyclohexanedimethanol.

For example, a polycarbonate polyol mainly containing 1,6-hexanediol is commercially available as PES-EXP815 from Nippon Polyurethane Industry.

A polycarbonate polyol may be produced by adding tetrahydrofuran to at least one of polyhydric alcohols, such as ethylene glycol, diethylene glycol, propylene glycol, dipropylene glycol, glycerol, trimethylolpropane, and neopentyl glycol, by ring-opening polymerization. These cyclic ethers may be used singly or in combination, or a compound containing at least two cyclic ethers may be used. For example, a polytetramethylene ether glycol PTXG-1800, which is produced from tetrahydrofuran and neopentyl glycol, is available from Asahi Kasei.

In addition, for example, Actocol EP3033 (produced by Mitsui Chemicals), PREMINOL 7003 (produced by Asahi Glass), PREMINOL 7001 (manufactured by Asahi Glass), and Adeka polyether AM302 (produced by Adeka) are commercially available as the polyol that can be used in the present embodiment.

Preferably, the polyol component of the polyurethane resin is expressed by the following formula (IV):

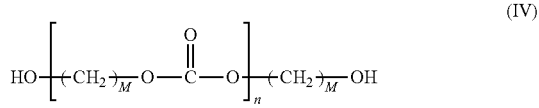

(IV)

where M represents an integer of 3 to 10, and n represents an integer of 2 to 14.

The polyol expressed by formula (IV) may be a single formula (IV) compound, or may contain two or more formula (IV) compounds having different M values of 3 to 10 or different n values of 2 to 14.

Preferably, the formula (IV) compound has an M of 5 to 7. Formula (IV) compounds having an M of 5 to 7 can further enhance the rub fastness, dry cleaning resistance and ejection stability of the ink jet recording ink composition.

In the polyurethane resin, it is preferable that the ratio of the number of OH groups of the formula (II) compound to the number of NCO groups of the polyisocyanate be 0.75 or less. such a composition can further enhance the rub fastness, dry cleaning resistance and ejection stability of the ink jet recording ink composition.

The polyurethane resin in the ink jet recording ink composition of the present embodiment is prepared by polymerizing monomer components containing a formula (I) compound and a formula (II) compound.

The polyurethane resin obtained by this polymerization preferably has a glass transition temperature of 30° C. or less. The use of a polyurethane resin having a glass transition temperature of 30° C. or less can further enhance the rub fastness, dry cleaning resistance and ejection stability of the ink jet recording ink composition. More preferably, the glass transition temperature is 25° C. or less. The glass transition temperature mentioned herein refers to a value measured in accordance with JIS K6900.

The polyurethane resin used in the present embodiment has an acid value of 100 mg KOH/g or less. The use of such a polyurethane resin can further enhance the rub fastness, dry cleaning resistance and ejection stability of the ink jet recording ink composition. Preferably, the acid value is 60 mg KOH/g or less.

Preferably, the polyurethane resin has an average particles size of 20 to 300 nm. The use of such a polyurethane resin can further enhance the rub fastness, dry cleaning resistance and ejection stability of the ink jet recording ink composition. More preferably, the average particle size of the polyurethane resin is 30 to 200 nm. The average particle sized mentioned herein refers to a volume average particle size measured by dynamic light scattering, for example, by using Microtrack UPA150 (manufactured by Microtrack Inc.).

Any solvent can be used for the polymerization of monomers without particular limitation. For example, a ketone solvent or an ether solvent may be used. Since the pigment dispersion is aqueous, it is preferable that the solvent can be removed later. Examples of such a solvent include ketone solvents, such as acetone, methyl ethyl ketone, diethyl ketone, methyl isobutyl ketone, and cyclohexanone; and ether solvents, such as dibutyl ether, tetrahydrofuran, and dioxane.

Preferably, the polyurethane resin content is higher than the pigment dispersion content on a mass basis. By adding a larger amount of polymer particles than the amount of pigment dispersion on a mass basis, the fixability of the pigment can be enhanced from the viewpoint of using as ink jet recording ink, particularly for textile.

Pigment Dispersion

The ink composition of the present embodiment contains a dispersion containing a water-dispersible pigment. The pigment dispersion has an average particle size in the range of 20 to 300 nm. The average particle of the pigment dispersion can be measured by dynamic light scattering, for example, by using Microtrack UPA150 (manufactured by Microtrack Inc.). The dispersion containing a water-dispersible pigment may be a dispersion in which a pigment is dispersed in water, or may be a dispersion in which a pigment is dispersed without water.

The pigment contained in the dispersion is not particularly limited as long as it can be dispersed in water, and may be a self-dispersing pigment that can be dispersed in water without a dispersant. The phrase "can be dispersed in water without a dispersant" means that the pigment can be stably dispersed in water because of its hydrophilic group even if a dispersant is not used.

An ink containing a self-dispersing pigment as a coloring agent does not require a dispersant to disperse the pigment. Accordingly, the ink composition is hardly foamed because the degradation of the defoaming property of the ink composition resulting from the presence of a dispersant does not occur. Consequently, the ink composition can be stably ejected. Also, a significant increase in viscosity resulting from the presence of the dispersant does not occur. Accordingly, the ink composition can be easily handled, and, for example, a large amount of pigment can be added to increase the print density.

In the ink composition of the present embodiment, the water-dispersible pigment is a self-dispersing pigment having a hydrophilic group at the surface thereof. The hydrophilic group is preferably selected from the group consisting of —OM, —COOM, —CO—, —SO$_3$M, —SO$_2$M, —SO$_2$NH$_2$, —RSO$_2$M, —PO$_3$HM, —PO$_3$M$_2$, —$_{SO2}$NHCOR, —NH$_3$, and —NR$_3$, wherein M represents a hydrogen atom, an alkali metal, ammonium, a substituted or unsubstituted phenyl group, or an organic ammonium, and R represents an alkyl group having a carbon number of 1 to 12, or a substituted or unsubstituted naphthyl group.

The self-dispersing pigment contained in the pigment dispersion can be prepared by, for example, physical treatment or chemical treatment for binding (grafting) the hydrophilic group to the surfaces of the pigment particles. For the physical treatment, vacuum plasma treatment may be performed. For the chemical treatment, for example, wet oxidation may be performed to oxidize the surfaces of the pigment particles with an oxidizing agent, or aminobenzoic acid may be bound to the surfaces of the pigment particles so as to bind the carboxyl group to the surfaces with a phenyl group therebetween.

If the ink composition is used as a color ink, the material pigment of the self-dispersing pigment in the pigment dispersion preferably has a hydrophilic group at the surfaces of the pigment particles with a phenyl group therebetween, from the viewpoint of high color developability. For binding a hydrophilic group to the surfaces of pigment particles with a phenyl group therebetween, various surface treatment processes can be applied. For example, sulfanilic acid, p-aminobenzoic acid, or 4-aminosalicylic acid may be bound to the surfaces of pigment particles. If the ink composition is used as a black ink, it is preferable that the self-dispersing pigment have been surface-treated by oxidation with a hypohalous acid and/or its salt, ozone, or persulfuric acid and/or a persulfate, from the viewpoint of high color developability.

In order to disperse the pigment in water, a macromolecular compound may be used. Preferably, the ink composition of the present embodiment contains a macromolecular compound having a polystyrene equivalent weight average molecular weight of 10000 to 200000, measured by gel permeation chromatography (GPC). In addition, it is preferable, but not limited to, that the macromolecular compound be a polymer containing at least 70% by weight of (meth)acrylate-(meth)acrylic acid copolymer component.

The macromolecular compound can be produced by a known process without particular limitation. For example, monomers may be added at one time in an early stage of the reaction, or at least one monomer may be added to the reaction system continuously or intermittently. Preferably, the polymerization is performed in the presence of a radical polymerization initiator and/or a catalyst.

The solvent used for the polymerization is preferably an alcohol, a ketone, an ether or a glycol ether.

Exemplary alcohol solvents include methanol, ethanol, isopropanol, 1-butanol, tertiary butanol, isobutanol, and diacetone alcohol.

Exemplary ketone solvents include acetone, methyl ethyl ketone, diethyl ketone, methyl isobutyl ketone, and cyclohexanone.

Exemplary ether solvents include dibutyl ether, tetrahydrofuran, and dioxane.

Exemplary glycol ether solvents include ethylene glycol, diethylene glycol monomethyl ether, diethylene glycol monoethyl ether, diethylene glycol diethyl ether, and butyl cellosolve.

Examples of the radical polymerization initiator include organic peroxides, such as t-butyl peroxy-2-ethylhexanoate, di-t-butyl peroxide, t-butyl peroxybenzoate, and t-butyl peroxyoctoate; and azo compounds, such as 2,2'-azobisisobutyronitrile, 2,2'-azobis(2,4-dimethylvaleronitrile), dimethyl-2,2'-azobisbutylate, and 2,2'-azobis(2-methylbutyronitrile)).

The amount of the radical polymerization initiator to be added is preferably in the range of 0.01 to 5 mol % relative to the monomers used for the polymerization.

The polymerization temperature is preferably, but is not limited to, 30 to 100° C., and more preferably 40 to 90° C. If the polymerization temperature is too low, the polymerization rate is likely to be reduced.

In order to stabilize the dispersion, a water-dispersible or water-soluble polymer, a surfactant, and/or a pigment dispersant may be added as a dispersion stabilizer in addition to the macromolecular compound.

In order to disperse the pigment of the ink composition in water, the pigment may be coated with a polymer.

The pigment coated with a polymer refers to a polymer-coated pigment produced by phase inversion emulsification of a pigment in a water phase so that a polymer coats the surfaces of the pigment particles. By applying the phase inversion emulsification to disperse the pigment, the dispersion stability of the pigment can be increased.

Commercially available copolymers may be used as the polymer singly or in combination to an extent not affecting properties as the polymer used for dispersing the pigment. Such copolymers include styrene-(meth)acrylic acid copolymer, styrene-(meth)acrylic acid-(meth)acrylic ester copolymer, polyethylene glycol(meth)acrylate-(meth)acrylic acid copolymer, vinyl acetate-maleic acid copolymer, and styrene-maleic acid copolymer. Preferably, a copolymer of benzyl acrylate, cyclohexyl acrylate or their mixture and acrylic acid accounts for at least 80% of the polymer. In addition to these, other acrylic esters may be used. Examples of such an additional acrylic ester include methyl acrylate, ethyl acrylate, propyl acrylate, butyl acrylate, hexyl acrylate, octyl acrylate, lauryl acrylate, 2-ethylhexyl acrylate, 2-ethylhexyl Carbitol acrylate, EO-modified phenol acrylate, N-vinyl pyrrolidone, isobornyl acrylate, dicyclopentenyl acrylate, dicyclopentanyl acrylate, dicyclopentenyloxyethyl acrylate, EO-modified p-cumylphenol acrylate, 2-hydroxyethyl-3-phenoxypropyl acrylate, and other commercially available acrylic esters. As an alternative to the acrylic acid, ω-carboxy-polycaprolactone monoacrylate, phthalic acid monohydroxyethyl acrylate, or a dimer acrylate may be used.

For the polymerization of the polymer used for dispersion, a solvent is used, such as an alcohol, a ketone, an ether, or a glycol ether. Since the pigment dispersion is aqueous, it is preferable that the solvent can be removed after the polymerization. Examples of such an alcohol solvent include methanol, ethanol, isopropanol, 1-butanol, tertiary butanol, isobutanol, and diacetone alcohol. Exemplary ketone solvents include acetone, methyl ethyl ketone, diethyl ketone, methyl isobutyl ketone, and cyclohexanone. Exemplary ether solvents include dibutyl ether, tetrahydrofuran, and dioxane. Exemplary glycol ether solvents include ethylene glycol, diethylene glycol monomethyl ether, diethylene glycol monoethyl ether, diethylene glycol diethyl ether, and butyl cellosolve.

Examples of the radical polymerization initiator for polymerizing the polymer include organic peroxides, such as t-butyl peroxy-2-ethylhexanoate, di-t-butyl peroxide, t-butyl peroxybenzoate, and t-butyl peroxyoctoate; azo compounds, such as 2,2'-azobisisobutyronitrile, 2,2'-azobis(2,4-dimethylvaleronitrile), dimethyl-2,2'-azobis butylate, and 2,2'-azobis(2-methylbutyronitrile); and potassium persulfate and sodium persulfate. In addition, other compounds that can induce radical polymerization may be used without particular limitation. The amount of the radical polymerization initiator to be used is preferably in the range of 0.01 to 5 mol % relative to the amount of monomers used for the polymerization The polymerization temperature is preferably, but is not limited to, 30 to 100° C., and more preferably 40 to 90° C. If the polymerization temperature is low, it takes a long time to polymerize monomers and the polymerization ratio can be reduced. Consequently, a large amount of monomer may remain without being polymerized.

Preferably, the polystyrene equivalent weight average molecular weight of the polymer measured by gel permeation chromatography (GPC) is 10,000 to 200,000. By setting the polystyrene equivalent weight average molecular weight in the range of 10,000 to 200,000, the fixability of the pigment can be enhanced from the viewpoint of using as ink jet recording ink particularly for textile.

In addition to the polymer used as a dispersant, a water-dispersible or water-soluble polymer or surfactant may be added as a dispersion stabilizer to stabilize the dispersion.

When the ink composition is used for a black ink, carbon blacks (C. I. Pigment Black 7) can be suitably used, such as furnace black, lampblack, acetylene black, and channel black. Metal oxides may be used, such as copper oxide, iron oxide (C. I. Pigment Black 11), and titanium oxide. Organic pigment such as aniline black (C. I. Pigment Black 1) may also be used.

When it is used for color inks, various pigments may be used as coloring agents, such as C. I. Pigment Yellows 1 (fast yellow G), 3, 12 (disazo yellow AAA), 13, 14, 17, 24, 34, 35, 37, 42 (yellow iron oxide), 53, 55, 74, 81, 83 (disazo yellow HR), 93, 94, 95, 97, 98, 100, 101, 104, 108, 109, 110, 117, 120, 128, 138, 153, 155, 180, and 185; C. I. Pigment Reds 1, 2, 3, 5, 17, 22 (brilliant fast scarlet), 23, 31, 38, 48:2 (permanent red 2B (Ba)), 48:2 (permanent red 2B (Ca)), 48:3 permanent red 2B (Sr)), 48:4 (permanent red 2B (Mn)), 49:1, 52:2, 53:1, 57:1 (brilliant carmine 6B), 60:1, 63:1, 63:2, 64:1, 81 (rhodamine 6G lake), 83, 88, 101 (colcothar), 104, 105, 106, 108 (cadmium red), 112, 114, 122 (quinacridone magenta), 123, 146, 149, 166, 168, 170, 172, 177, 178, 179, 185, 190, 193, 202, 206, 209, and 219; C. I. pigment violets 19 and 23; C. I. Pigment Orange 36; C. I. Pigment Blues 1, 2, 15 (phthalocyanine blue R), 15:1, 15:2, 15:3 (phthalocyanine blue G), 15:4, 15:6 (phthalocyanine blue E), 16, 17:1, 56, 60, and 63; and C. I. Pigment Greens 1, 4, 7, 8, 10, 17, 18, and 36.

The pigment is dispersed with a dispersing machine, and the dispersing machine can be selected from a variety of commercially available machines. In this instance, non-medium dispersion is preferably applied from the viewpoint of preventing contamination with foreign matter. Examples of the dispersing machine include a wet-jet mill (Zenas), Nanomizer (Nanomizer), a homogenizer (Gorlin), Ultimizer (Sugino Machine), and a microfluidizer (Microfluidics).

The pigment content in the ink composition of the present embodiment is preferably 0.5% to 30%, more preferably 1.0% to 15%. If the pigment content is less than 0.5%, the print density becomes insufficient. If the pigment content is more than 30%, the viscosity of the ink can increase or structural viscosity can occur, thereby degrading the ejection stability of the ink ejected from the ink jet head.

Water and Other Constituents

The ink composition of the present embodiment contains water as a main solvent. The water may be pure water such as ion exchanged water, ultrafiltered water, reverse osmotic water, or distilled water, or ultrapure water. Preferably, sterile water prepared by, for example, UV irradiation or addition of hydrogen peroxide is used. The use of sterile water can prevent the occurrence of mold and bacteria when the ink composition is stored in the long term.

Preferably, the ink composition further contains 1,2-alkylene glycol. The addition of 1,2-alkylene glycol reduces bleeding and enhances the printing quality, and its combined use with macromolecular particles and a resin dispersant enhances the color developability. Preferably, 1,2-alkylene glycols having a carbon number of 5 or 6 are used, such as 1,2-hexanediol, 1,2-pentanediol, and 4-methyl-1,2-pentanediol. Among these, preferred are 1,2-hexanediol and 4-methyl-1,2-pentanediol, which have carbon numbers of 6. The 1,2-alkylene glycol content in the ink composition is 0.3% to 30% by weight, more preferably 0.5% to 10% by weight.

Preferably, the ink composition further contains a water-compatible and water-soluble organic solvent that can stably dissolve or disperse the pigment, dispersant, polymer, pH adjusting agent and other constituents in the ink composition.

Preferably, the water-soluble organic solvent has the function of increasing the solubilities of glycol ether, which has a low solubility in water, and other constituents, the function of increasing the penetration in recording media (for example, paper), and the function of preventing the clogging of the nozzles. Examples of such a water-soluble organic solvent include alkyl alcohols having a carbon number of 1 to 4, such as ethanol, methanol, butanol, propanol, and isopropanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol monoisopropyl ether, diethylene glycol monoisopropyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol monopropyl ether, dipropylene glycol monomethyl ether, dipropylene glycol monoethyl ether, dipropylene glycol mono-n-propyl ether, dipropylene glycol monoisopropyl ether, propylene glycol mono-n-butyl ether, and dipropylene glycol mono-n-butyl ether; and formamide, acetamide, dimethylsulfoxide, sorbitol, sorbitan, acetin, diacetin, triacetin, and sulfolane; and mixtures of these compounds.

Among those water-soluble organic solvents, preferred are diethylene glycol monobutyl ether, triethylene glycol monobutyl ether, propylene glycol monobutyl ether, dipropylene glycol monobutyl ether, diethylene glycol monopentyl ether, triethylene glycol monopentyl ether, diethylene glycol monohexyl ether, and triethylene glycol monohexyl ether. By combining these glycol ethers with a polymer and a macromolecular dispersant, the bleeding can be reduced to enhance the printing quality.

In addition, a saccharide may be used for the same reason. The saccharide may be a monosaccharide or a polysaccharide, and examples of the saccharide include glucose, mannose, fructose, ribose, xylose, arabinose, lactose, galactose, aldonic acid, glucitose, maltose, cellobiose, sucrose, trehalose, maltotriose, alginic acid and its salts, cyclodextrins, and cellulose. The saccharide content may be set as needed, and is preferably in the range of 0.05% to 30% by weight. As long as the saccharide content is in this range, even if the ink composition is dried at the tip of the head, the clogging can be easily recovered, and the ink composition has such a viscosity as stable printing can be performed. If glucose, mannose, fructose, ribose, xylose, arabinose, lactose, galactose, aldonic acid, glucitose, maltose, cellobiose, sucrose, trehalose, or maltotriose is used in the present embodiment, the saccharide content is preferably 3% to 20% by weight. On the other hand, alginic acid, its salts and celluloses tend to increase the viscosity of the ink composition. If these saccharides are used, attention should be paid to the amount of the saccharide to be added.

Preferably, the ink composition of the present embodiment further contains a surfactant to control the penetration thereof. The surfactant is preferably compatible with the other constituents of the ink composition. Also, the surfactant is preferably penetrable and stable. The surfactant is preferably amphoteric or nonionic.

Preferred amphoteric surfactants include lauryldimethylaminoacetic acid betaine, coconut oil fatty acid amidopropyldimethylaminoacetic acid betaine, polyoctyl polyaminoethyl glycine, and imidazoline derivatives.

Preferred nonionic surfactants include acetylene glycol surfactants; acetylene alcohol surfactants; ethers, such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, polyoxyethylene alkyl ether, and polyoxyalkylene alkyl ether; esters, such as polyoxyethylene oleic acid, polyoxyethylene oleic acid ester, polyoxyethylene distearic acid ester, sorbitan laurate, sorbitan monostearate, sorbitan monooleate, sorbitan sesquioleate, polyoxyethylene monooleate, and polyoxyethylene stearate; silicon surfactants, such as dimethyl polysiloxane; and other surfactants such as fluorine alkyl ester and perfluoroalkyl carboxylate and other fluorine-containing surfactants. Among those, acetylene glycol surfactants and acetylene alcohol surfactants are particularly preferred. These surfactants do not foam in the ink composition, and can advantageously defoam the ink composition. Exemplary acetylene glycol surfactants and acetylene alcohol surfactants include 2,4,7,9-tetramethyl-5-decyne-4,7-diol, 3,6-dimethyl-4-octyne-3,6-diol, and 3,5-dimethyl-1-hexyne-3-ol. Commercially available glycol or acetylene alcohol surfactants may be used, such as Surfinols 61, 82, 104, 465, 485 and TG produced by Air Products (United Kingdom), and Olfine STG and Olfine E1010 produced by Nisshin Chemical Industry.

Preferably, the surfactant content in the ink composition is in the range of 0.01% to 3% by weight, and more preferably in the range of 0.05% to 2.0% by weight.

In the present embodiment, it is particularly preferable that an acetylene glycol surfactant and/or an acetylene alcohol surfactant be used. By use of an acetylene glycol surfactant and/or an acetylene alcohol surfactant, bleeding can be reduced to increase the printing quality. Preferably, the acetylene glycol surfactant and/or acetylene alcohol surfactant is at least one selected from the group consisting of 2,4,7,9-tetramethyl-5-decyne-4,7-diol and its alkylene oxide adducts, and 2,4-dimethyl-5-decyne-4-ol and its alkylene oxide adducts. The acetylene glycol surfactant and/or acetylene alcohol surfactant is commercially available as the Olfine 104 series or Olfine E series such as Olefine E1010, produced by Nisshin Chemical Industry, or Surfinol 465 or Surfinol 61 produced by Air Products. Ink compositions containing such an acetylene glycol and/or acetylene alcohol surfactant can dry soon and, thus, allow high-speed printing.

A plurality of surfactants may be combined to further reduce the bleeding of the ink composition. For example, 1,2-alkylene glycol and an acetylene glycol surfactant and/or acetylene alcohol surfactant may be combined, or glycol ether and an acetylene glycol surfactant and/or acetylene alcohol surfactant may be combined.

The ink composition of the present embodiment may contain a pH buffer, an antioxidant, a UV absorber, a preservative or fungicide, and a chelating agent, if necessary. Examples of the pH buffer include collidine, imidazole, phosphoric acid, 3-(N-morpholino) propanesulfonic acid, tris(hydroxymethyl)aminomethane, and boric acid.

Examples of the antioxidant or the UV absorber include allophanate compounds such as allophanate and methyl allophanate; biuret compounds such as biuret, dimethyl biuret, and tetramethyl biuret; L-ascorbic acid and its salts; Tinuvins 328, 900, 1130, 384, 292, 123, 144, 622, 770 and 292, Irgacors 252 and 153, Irganoxes 1010, 1076, 1035 and MD1024 (each produced by Ciba-Geigy); and lanthanide oxides.

Examples of the preservative or fungicide include sodium benzoate, sodium pentachlorophenol, sodium 2-pyridinethiol-1-oxide, sodium sorbate, sodium dehydroacetate, and 1,2-dibenzisothiazolin-3-one (Proxel GXL, Proxel XL-2, Proxel LV, Proxel AQ, Proxel BD20, and Proxel DL, produced by Arch Chemicals). Ethylenediaminetetraacetic acid (EDTA) may be used as the chelating agent.

Method for Producing Ink Composition

The ink composition of the present embodiment may be prepared by dispersing the above described constituents in a dispersing/mixing machine (for example, ball mill, sand mill, attritor, basket mill, or roll mill). Preferably, the resulting mixture of the ink constituents is filtered through a filter, such as a membrane filter or a mesh filter, to remove coarse particles.

Ink Jet Recording Method and Apparatus

The ink composition can be used in ink jet recording methods without particular limitation, and can be advantageously used particularly in ink jet textile printing. In the ink jet recording methods, printing is performed by ejecting the droplets of the ink composition onto a heated recording medium. For example, an ink composition stored in a nozzle head may be intermittently ejected by converting an electrical signal to a mechanical signal with electrostrictive elements, thereby forming characters or symbols on the surface of a recording medium. The ink composition stored in the nozzle head may be intermittently ejected by expanding the bubbles in the ink composition produced by heating it from a position very close to the ejection port, thereby forming characters or symbols on the surface of a recording medium. In the present embodiment, the ink composition is preferably ejected by using electrostrictive elements, such as piezoelectric elements, but not by heating. If a heater or heating element is used, the polymers including the pigment dispersant may be degraded and, consequently, the ejection may become unstable. If a large amount of ink composition is ejected over a long time like a textile ink jet ink composition, the ejection of the ink composition is preferably performed by a method using electrostrictive elements without heating.

EXAMPLES

The invention will be further described in detail with reference to Examples. The invention is not, however, limited to the examples.

Preparation of Carbon Black Dispersion 1

In a motor mill M 250 (manufacture by Eiger Japan), 100.0 g of a commercially available carbon black (#44, produced by Mitsubishi Chemical) was mixed with 900.0 g of water and dispersed in the water for 2 hours at a beads filling rate of 70% and a rotational speed of 5000 rpm. In the resulting dispersion, 1500.0 g of sodium hypochlorite (effective chlorine concentration: 12%) was dropped. Then, the dispersion was subjected to a reaction for 5 hours with agitating in the Eiger motor mill, and was further agitated at a controlled temperature of 100° C. for 8 hours. The resulting slurry was filtered and rinsed with water, and then the carbon black content in the slurry was adjusted to 15% by weight. Thus a surface-treated carbon black dispersion was prepared. The particle size was measured with a Microtrack particle size distribution analyzer UPA250 (available from Nikkiso). The result was 180 nm.

Preparation of Carbon Black Dispersion 2

A carbon black dispersion of more than 300 nm in particle size was prepared from a commercially available carbon black (#44, produced by Mitsubishi Chemical) in the same manner as carbon black dispersion 1. The particle size was measured in the same manner as in the preparation of carbon black dispersion 1, and the result was 350 nm. The resulting dispersion was used as carbon black dispersion 2.

Preparation of Red Pigment Dispersion

A red pigment dispersion was prepared from Pigment Red 254 (diketopyrrolopyrrole pigment, produced by Clariant). After mixing 20 parts by mass of Pigment Red 254, 5 parts by mass of polyoxyethylene cetyl ether (available from Nikko Chemicals), 30 parts by mass of aqueous solution of 1% Surfinol 440 (available from Nisshin Chemical Industry), and 45 parts by mass of ion exchanged water with stirring, the mixture was dispersed for 2 hours in an Eiger motor mill M250 (manufacture by Eiger Japan) at a beads filling rate of 70% and a rotational speed of 5000 rpm. Subsequently, a 20 parts by mass of aqueous solution of 20 mass % JONCRYL 683 (BASF Japan), which had been dissolved in ion exchanged water with an equivalent amount of triethanolamine, was added to 100 parts by mass of the resulting dispersion. The mixture was agitated at room temperature for 72 hours. Then, the dispersion liquid was centrifuged for 30 minutes in a centrifuge 05P-21 (manufactured by Hitachi) at 5000 rpm, followed by pressure filtration through a 2.5 μm membrane filter (manufactured by Advantech). The water content of the product was adjusted, and thus a red pigment dispersion containing 15% by weight of pigment was obtained. The particle size of the resulting dispersion was measured in the same manner as in the preparation of carbon black dispersion 1, and the result was 210 nm.

Preparation of Cyan Pigment Dispersion 1

After mixing 20 parts by mass of Pigment Blue 15:3 (copper phthalocyanine pigment, available from Clariant), 4.5 parts by mass of polyoxyethylene cetyl ether (available from Nikko Chemicals), 30 parts by mass of aqueous solution of 1% Surfinol 82 (available from Nisshin Chemical Industry), and 45.5 parts by mass of ion exchanged water with stirring, the mixture was dispersed for 2 hours in an Eiger motor mill M250 (manufacture by Eiger Japan) at a beads filling rate of 70% and a rotational speed of 5000 rpm. Subsequently, a 20 parts by mass of aqueous solution of 20 mass % JONCRYL 683 (BASF Japan), which had been dissolved in ion exchanged water with an equivalent amount of triethanolamine, was added to 100 parts by mass of the resulting dispersion. The mixture was agitated at room temperature for 72 hours. Then, the dispersion liquid was centrifuged for 30 minutes in a centrifuge 05P-21 (Hitachi) at 5000 rpm, followed by pressure filtration through a 2.5 μm membrane filter (manufactured by Advantech). The water content of the product was adjusted, and thus cyan pigment dispersion 1 containing 15% by weight of pigment was obtained. The particle size of the resulting dispersion was measured in the same manner as in the preparation of carbon black dispersion 1, and the result was 150 nm.

Preparation of Cyan Pigment Dispersion 2

A pigment dispersion of more than 300 nm in particle size was prepared from Pigment Blue 15:3 (copper phthalocyanine pigment, available from Clariant) in the same manner as cyan pigment dispersion 1. The particle size was measured in the same manner as in the preparation of carbon black dispersion 1, and the result was 350 nm. The resulting dispersion was used as cyan pigment dispersion 2.

Preparation of Cyan Pigment Dispersion 3

For cyan pigment dispersion 3, Pigment Blue 15:3 (copper phthalocyanine pigment, available from Clariant) was used. A reaction vessel equipped with a stirrer, a thermometer, a reflux tube and a dropping funnel was purged with nitrogen. This reaction vessel was charged with 75 parts by mass of benzyl acrylate, 2 parts by mass of acrylic acid, and 0.3 parts by mass of t-dodecyl mercaptan, and heated to 70° C. Then, 150 parts by mass of benzyl acrylate, 15 parts by mass of acrylic acid, 5 parts by mass of butyl acrylate, 1 part by mass of t-dodecyl mercaptan, 20 parts by mass of methyl ethyl ketone and 1 part by mass of sodium persulfate were placed in the dropping funnel, and dropped into the reaction vessel over a period of 4 hours. Thus a macromolecular dispersant was polymerized. Subsequently, methyl ethyl ketone was dropped in the reaction vessel to prepare a solution containing 40% by mass of the macromolecular dispersant. Then, 40 parts by mass of the macromolecular dispersant solution, 30 parts by mass of Pigment Blue 15:3, 100 parts by mass of 0.1 mol/L sodium hydroxide aqueous solution, 30 parts by mass of methyl ethyl ketone were mixed. The mixture was dispersed by 15 passes at 200 MPa with an ultrahigh-pressure homogenizer Ultimizer HJP-25005 (manufactured by Sugino Machine). The resulting dispersion was placed in another vessel, and 300 parts by mass of ion exchanged water was added to the vessel, followed by stirring for an hour. Then, the entirety of methyl ethyl ketone and part of water were evaporated in a rotary evaporator, and the pH was adjusted to 9 with 0.1 mol/L sodium hydroxide solution. The product was filtered through a 2.5 μm membrane filter, and ion exchanged water was added to adjust the pigment content to 15% by mass. Thus cyan pigment dispersion 3 was prepared. The particle size was measured in the same manner as in the preparation of carbon black dispersion 1, and the result was 80 nm.

Preparation of Cyan Pigment Dispersion 4

Cyan pigment dispersion 4 of more than 300 nm in particle size was prepared from Pigment Blue 15:3 (copper phthalocyanine pigment, available from Clariant) in the same manner as cyan pigment dispersion 3. The particle size was measured in the same manner as in the preparation of carbon black dispersion 1, and the result was 330 nm. The resulting dispersion was used as cyan pigment dispersion 4.

Preparation of Magenta Pigment Dispersion

A magenta pigment dispersion was prepared from Pigment Red 122 (dimethylquinacridone pigment, available from Clariant). A reaction vessel equipped with a stirrer, a thermometer, a reflux tube and a dropping funnel was purged with nitrogen. This reaction vessel was charged with 75 parts by mass of benzyl acrylate, 2 parts by mass of acrylic acid, and 0.3 parts by mass of t-dodecyl mercaptan, and heated to 70° C. Then, 150 parts by mass of benzyl acrylate, 15 parts by mass of acrylic acid, 5 parts by mass of butyl acrylate, 1 part by mass of t-dodecyl mercaptan, 20 parts by mass of methyl ethyl ketone and 1 part by mass of sodium persulfate were placed in the dropping funnel, and dropped into the reaction vessel over a period of 4 hours. Thus a macromolecular dispersant was polymerized. Subsequently, methyl ethyl ketone was dropped in the reaction vessel to prepare a solution containing 40% by mass of the macromolecular dispersant. Then, 40 parts by mass of the macromolecular dispersant solution, 30 parts by mass of Pigment Red 122, 100 parts by mass of 0.1 mol/L sodium hydroxide aqueous solution, 30 parts by mass of methyl ethyl ketone were mixed. The mixture was dispersed by 15 passes at 200 MPa with an ultrahigh-pressure homogenizer Ultimizer HJP-25005 (manufactured by Sugino Machine). Be resulting dispersion was placed in another vessel, and 300 parts by mass of ion exchanged water was added to the vessel, followed by stirring for an hour. Then, the entirety of methyl ethyl ketone and part of water were evaporated in a rotary evaporator, and the pH was adjusted to 9 with 0.1 mol/L sodium hydroxide solution. The product was filtered through a 2.5 μm membrane filter, and ion exchanged water was added to adjust the pigment content to 15% by mass. Thus a magenta pigment dispersion was prepared. The particle size was measured in the same manner as in the preparation of carbon black dispersion 1, and the result was 70 nm.

Preparation of Resin Dispersion 1

In a reaction vessel equipped with a dropping funnel, a thermometer, a water-cooled reflux condenser, a stirrer, a temperature regulator and a nitrogen inlet tube, 230.0 g of polycarbonate polyol (DURANOL™ T5651, available from Asahi Kasei Chemicals), 126.3 g of acetone and 0.06 g of dibutyltin dilaurate (DBTL) were added. The contents were heated to 40° C. and sufficiently mixed. Then, 87.5 g of HDI (hexamethylene diisocyanate) was added to the reaction vessel from the dropping funnel at 40° C. over a period of 60 minutes. The residual HDI in the dropping funnel was rinsed into the reaction vessel with 7.5 g of acetone.

The temperature of the reaction vessel was increased to 50° C. and kept for about 30 minutes. Then, 22.2 g of dimethylolpropionic acid (DMPA) and 12.6 g of triethylamine were added to the reaction vessel in that order from the dropping funnel. The dropping funnel was rinsed with 8.0 g of acetone. Then, the temperature of the reaction vessel was increased to 50° C. again and kept for 60 minutes.

After adding 532.0 g of ion exchanged water at 50° C. over 10 minutes, 268.0 g of 10% trimethylolpropane (TMP) aqueous solution was dropped over 5 minutes from the dropping funnel. Then, the dropping funnel was rinsed with 30.0 g of ion exchanged water. The mixture was allowed to stand at 50° C. for 1 hour and then cooled to room temperature. The acetone was removed under reduced pressure to yield resin dispersion 1 containing about 30% by mass of resin solid.

The accurate solid resin content in the resin dispersion was measured with an electronic moisture meter MA100 (available from Sartorius Mechatronics Japan). The THF-insoluble resin content was measured as below. A centrifuge tube was accurately weighed, and 1 g of resin dispersion 1 and 30 g of THF were accurately weighed into the centrifuge tube, followed by mixing. The mixture was centrifuged at a rotational speed of 17,000 rpm, and the supernatant was removed to obtain a gel remaining at the bottom of the tube. The centrifuge tube was placed in an oven and dried at 110° C. for 2 hours. Subsequently, the centrifuge tube was weighed again to calculate the mass of the residual gel. The THF-insoluble resin content was calculated form the above equation (A). The THF-insoluble content in resin dispersion 1 was 60% by mass.

Preparation of Resin Dispersion 2

In a reaction vessel equipped with a dropping funnel, a thermometer, a water-cooled reflux condenser, a stirrer, a temperature regulator and a nitrogen inlet tube, 230.0 g of polycarbonate polyol (DURANOL™ T5651, available from Asahi Kasei Chemicals), 126.3 g of acetone and 0.06 g of DBTL were added. The contents were heated to 40° C. and sufficiently mixed. Then, 87.5 g of HDI was added to the reaction vessel from the dropping funnel at 40° C. over a period of 60 minutes. The residual HDI in the dropping funnel was rinsed into the reaction vessel with 7.5 g of acetone.

The temperature of the reaction vessel was increased to 50° C. and kept for about 30 minutes. Then, 22.2 g of DMPA and 12.6 g of triethylamine were added to the reaction vessel in that order from the dropping funnel. The dropping funnel was rinsed with 8.0 g of acetone. Then, the temperature of the reaction vessel was increased to 50° C. again and kept for 60 minutes.

After adding 471.0 g of ion exchanged water at 50° C. over 10 minutes, 134.0 g of 10% TMP aqueous solution was added over 5 minutes, and then 75.0 g of 20% triethylene glycol (TEG) aqueous solution was added over 5 minutes. Then, the dropping funnel was rinsed with 140.0 g of ion exchanged water. The mixture was allowed to stand at 50° C. for 1 hour and then cooled to room temperature. The acetone was removed under reduced pressure to yield resin dispersion 2 containing about 30% by mass of resin solid. The THF-insoluble content in resin dispersion 2 was measured in the same manner as in the preparation of resin dispersion 1, and the result was 53% by mass.

Preparation of Resin Dispersion 3

In a reaction vessel equipped with a dropping funnel, a thermometer, a water-cooled reflux condenser, a stirrer, a temperature regulator and a nitrogen inlet tube, 230.0 g of polycarbonate polyol (DURANOL™ T5651, available from Asahi Kasei Chemicals), 126.3 g of acetone and 0.06 g of DBTL were added. The contents were heated to 40° C. and sufficiently mixed. Then, 115.4 g of isophorone diisocyanate (IPDI) was added to the reaction vessel from the dropping funnel at 40° C. over a period of 60 minutes. The residual IPDI in the dropping funnel was rinsed into the reaction vessel with 7.5 g of acetone.

The temperature of the reaction vessel was increased to 50° C. and kept for about 30 minutes. Then, 22.2 g of DMPA and 12.6 g of triethylamine were added to the reaction vessel in that order from the dropping funnel. The dropping funnel was rinsed with 8.0 g of acetone. Then, the temperature of the reaction vessel was increased to 50° C. again and kept for 60 minutes.

After adding 596.0 g of ion exchanged water at 50° C. over 10 minutes, 268.0 g of 10% TMP aqueous solution was added over 5 minutes from the dropping funnel. Then, the dropping funnel was rinsed with 30.0 g of ion exchanged water. The mixture was allowed to stand at 50° C. for 1 hour and then cooled to room temperature. The acetone was removed under reduced pressure to yield resin dispersion 3 containing about 30% by mass of resin solid. The THF-insoluble content in resin dispersion 3 was measured in the same manner as in the preparation of resin dispersion 1, and the result was 55% by mass.

Preparation of Resin Dispersion 4

In a reaction vessel equipped with a dropping funnel, a thermometer, a water-cooled reflux condenser, a stirrer, a temperature regulator and a nitrogen inlet tube, 90.0 g of polyester carbonate diol (DESMOPHENE C200, available from Bayer), 245.5 g of polytetramethylene glycol (TERATHANE 1400, available from Invista), 140.0 g of acetone and 0.04 g of DBTL were added. The contents were heated to 40° C. and sufficiently mixed. Then, 108.3 g of IPDI was added to the reaction vessel from the dropping funnel at 40° C. over a period of 60 minutes. The residual IPDI in the dropping funnel was rinsed into the reaction vessel with 5.8 g of acetone.

The temperature of the reaction vessel was increased to 50° C. and kept for about 30 minutes. Then, 22.3 g of DMPA and 12.6 g of triethylamine were added to the reaction vessel in that order from the dropping funnel. The dropping funnel was rinsed with 12.5 g of acetone. Then, the temperature of the reaction vessel was increased to 50° C. again and kept for 60 minutes.

After adding 787.0 g of ion exchanged water at 50° C. over 10 minutes, 49.0 g of 6.25% triethylenetetramine (TETA) aqueous solution was dropped over 5 minutes from the dropping funnel. Then, the dropping funnel was rinsed with 40.0 g of ion exchanged water. The mixture was allowed to stand at 50° C. for 1 hour and then cooled to room temperature. The acetone was removed under reduced pressure to yield resin dispersion 4 containing about 34% by mass of resin solid. The THF-insoluble content in resin dispersion 4 was measured in the same manner as in the preparation of resin dispersion 1, and the result was 8% by mass.

Preparation of Resin Dispersion 5

In a reaction vessel equipped with a dropping funnel, a thermometer, a water-cooled reflux condenser, a stirrer, a temperature regulator and a nitrogen inlet tube, 699.2 g of polyester carbonate diol (DESMOPHENE C200, available from Bayer), 280.0 g of acetone and 0.06 g of DBTL were added. The contents were heated to 40° C. and sufficiently mixed. Then, 189.1 g of IPDI was added to the reaction vessel from the dropping funnel at 40° C. over a period of 60 minutes. The residual IPDI in the dropping funnel was rinsed into the reaction vessel with 15.5 g of acetone.

The temperature of the reaction vessel was increased to 50° C. and kept for about 30 minutes. Then, 44.6 g of DMPA and 25.2 g of triethylamine were added to the reaction vessel in that order from the dropping funnel. The dropping funnel was rinsed with 15.5 g of acetone. Then, the temperature of the reaction vessel was increased to 50° C. again, and this temperature was kept until the percentage of NCO was reduced to 1.14% or less. The percentage of NCO was observed as an index of the progress of polyurethane reaction. The percentage of NCO was determined by dibutylamine titration in which a NCO-containing prepolymer was allowed to react with a dibutylamine solution in a known concentration and the residual amine was subjected to back titration with HCl.

After adding 1498.0 g of ion exchanged water at 50° C. over 10 minutes, the mixture of 97.5 g of 6.25% ethylenediamine (EDA) aqueous solution and 29.7 g of 6.25% TETA aqueous solution was added over 5 minutes from the dropping funnel. Then, the dropping funnel was rinsed with 80.0 g of ion exchanged water. The mixture was allowed to stand at 50° C. for 1 hour and then cooled to room temperature. The acetone was removed under reduced pressure to yield resin dispersion 5 containing about 35% by mass of resin solid. The THF-insoluble content in resin dispersion 5 was measured in the same manner as in the preparation of resin dispersion 1, and the result was 5% by mass.

Preparation of Resin Dispersion 6

In a reaction vessel equipped with a dropping funnel, a thermometer, a water-cooled reflux condenser, a stirrer, a temperature regulator and a nitrogen inlet tube, 335.0 g of polyester carbonate diol (DESMOPHENE C200, available from Bayer), 142.0 g of acetone and 0.04 g of DBTL were added. The contents were heated to 40° C. and sufficiently mixed. Then, 99.0 g of IPDI and 29.5 g of mixture (DESMODUR N3400, available from Bayer) containing a dimer (40% by mass) and a trimer (60% by mass) of hexamethylene diisocyanate were added to the reaction vessel from the dropping funnel at 40° C. over 60 minutes. The residue in the dropping funnel was rinsed into the reaction vessel with 10.0 g of acetone.

The temperature of the reaction vessel was increased to 50° C. and kept for about 30 minutes. Then, 23.4 g of DMPA and 13.6 g of triethylamine were added to the reaction vessel in that order from the dropping funnel. The dropping funnel was rinsed with 10.0 g of acetone. Then, the temperature of the reaction vessel was increased to 50° C. again, and this temperature was kept until the percentage of NCO was reduced to 2.3% or less. The percentage of NCO was observed as an index of the progress of polyurethane reaction. The percentage of NCO was determined in the same manner as in the preparation of resin dispersion 5.

After adding 700.0 g of ion exchanged water at 50° C. over 10 minutes, 174.0 g of 6.25% EDA aqueous solution was dropped over 5 minutes from the dropping funnel. Then, the dropping funnel was rinsed with 40.0 g of ion exchanged water. The mixture was allowed to stand at 50° C. for 1 hour and then cooled to room temperature. The acetone was removed under reduced pressure to yield resin dispersion 6 containing about 34% by mass of resin solid. The THF-insoluble content in resin dispersion 6 was measured in the same manner as in the preparation of resin dispersion 1, and the result was 39% by mass.

Preparation of Resin Dispersion 7

In a reaction vessel equipped with a dropping funnel, a thermometer, a water-cooled reflux condenser, a stirrer, a temperature regulator and a nitrogen inlet tube, 230.0 g of polycarbonate polyol (DURANOL™ T5651, available from Asahi Kasei Chemicals), 126.3 g of acetone and 0.06 g of DBTL were added. The contents were heated to 40° C. and sufficiently mixed. Then, 87.5 g of HDI was added to the reaction vessel from the dropping funnel at 40° C. over a period of 60 minutes. The residual HDI in the dropping funnel was rinsed into the reaction vessel with 7.5 g of acetone.

The temperature of the reaction vessel was increased to 50° C. and kept for about 30 minutes. Then, 22.2 g of DMPA and 12.6 g of triethylamine were added to the reaction vessel in that order from the dropping funnel. The dropping funnel was rinsed with 8.0 g of acetone. Then, the temperature of the reaction vessel was increased to 50° C. again, and this temperature was kept until the percentage of NCO was reduced to 1.14% or less. The percentage of NCO was observed as an index of the progress of polyurethane reaction. The percentage of NCO was determined in the same manner as in the preparation of resin dispersion 5.

After adding 560.0 g of ion exchanged water at 50° C. over 10 minutes, the mixture of 97.5 g of 6.25% ethylenediamine (EDA) aqueous solution and 29.7 g of 6.25% TETA aqueous solution was dropped over 5 minutes from the dropping funnel. Then, the dropping funnel was rinsed with 80.0 g of ion exchanged water. The mixture was allowed to stand at 50° C. for 1 hour and then cooled to room temperature. The acetone was removed under reduced pressure to yield resin dispersion 7 containing about 30% by mass of resin solid.

The THF-insoluble content in resin dispersion 7 was measured in the same manner as in the preparation of resin dispersion 1, and the result was 5% by mass.

Preparation of Resin Dispersion 8

In a reaction vessel equipped with a dropping funnel, a thermometer, a water-cooled reflux condenser, a stirrer, a temperature regulator and a nitrogen inlet tube, 230.0 g of polycarbonate polyol (DURANOL™ T5651, available from Asahi Kasei Chemicals), 126.3 g of acetone and 0.06 g of DBTL were added. The contents were heated to 40° C. and sufficiently mixed. Then, 115.4 g of IPDI was added to the reaction vessel from the dropping funnel at 40° C. over a period of 60 minutes. The residual IPDI in the dropping funnel was rinsed into the reaction vessel with 7.5 g of acetone.

The temperature of the reaction vessel was increased to 50° C. and kept for about 30 minutes. Then, 22.2 g of DMPA and 12.6 g of triethylamine were added to the reaction vessel in that order from the dropping funnel. The dropping funnel was rinsed with 8.0 g of acetone. Then, the temperature of the reaction vessel was increased to 50° C. again and kept for 60 minutes.

After adding 620.0 g of ion exchanged water at 50° C. over 10 minutes, the mixture of 97.5 g of 6.25% ethylenediamine (EDA) aqueous solution and 29.7 g of 6.25% TETA aqueous solution was added over 5 minutes from the dropping funnel. Then, the dropping funnel was rinsed with 80.0 g of ion exchanged water. The mixture was allowed to stand at 50° C. for 1 hour and then cooled to room temperature. The acetone was removed under reduced pressure to yield resin dispersion 8 containing about 30% by mass of resin solid. The THF-insoluble content in resin dispersion 8 was measured in the same manner as in the preparation of resin dispersion 1, and the result was 14% by mass.

Preparation of Resin Dispersion 9

In a reaction vessel equipped with a dropping funnel, a thermometer, a water-cooled reflux condenser, a stirrer, a temperature regulator and a nitrogen inlet tube, 240.0 g of polycarbonate polyol (DURANOL™ T5651, available from Asahi Kasei Chemicals), 89.1 g of HDI and 260.0 g of methyl ethyl ketone (MEK) were mixed. The mixture was heated to 75° C. and this temperature was kept for 3 hours.

Then, a mixed solution of 9.4 g of MEK, 13.4 g of DMPA and 10.1 g of triethylamine was added to the reaction vessel from the dropping funnel. The dropping funnel was rinsed with 8.0 g of MEK, and the temperature of the reaction vessel was increased to 75° C. and kept for 2 hours.

Then, the contents in the reaction vessel were cooled to 30° C., and 671.0 g of 4% TMP aqueous solution was dropped into the reaction vessel. The dropping funnel was rinsed with 180.0 g of ion exchanged water. After stirring the contents for 1 hour, the MEK was removed at 50° C. under reduced pressure to yield resin dispersion 9 containing about 30% by mass of resin solid. The THF-insoluble content in resin dispersion 9 was measured in the same manner as in the preparation of resin dispersion 1, and the result was 58% by mass.

Preparation of Resin Dispersion 10

In a reaction vessel equipped with a dropping funnel, a thermometer, a water-cooled reflux condenser, a stirrer, a temperature regulator and a nitrogen inlet tube, 240.0 g of polycarbonate polyol (DURANOL™ T5651, available from Asahi Kasei Chemicals), 89.1 g of HDI and 260.0 g of methyl ethyl ketone (MEK) were mixed. The mixture was heated to 75° C. and this temperature was kept for 3 hours.

Then, a mixed solution of 9.4 g of MEK, 13.4 g of DMPA and 10.1 g of triethylamine was added to the reaction vessel from the dropping funnel. The dropping funnel was rinsed with 8.0 g of MEK, and the temperature of the reaction vessel was increased to 75° C. and kept for 2 hours.

Then, the contents in the reaction vessel were cooled to 30° C., and 751.0 g of 6% TEG aqueous solution was dropped into the reaction vessel. The dropping funnel was rinsed with 150.0 g of ion exchanged water. After stirring the contents for 1 hour, the MEK was removed at 50° C. under reduced pressure to yield resin dispersion 10 containing about 30% by mass of resin solid. The THF-insoluble content in resin dispersion 10 was measured in the same manner as in the preparation of resin dispersion 1, and the result was 52% by mass.

Preparation of Resin Dispersion 11

In a reaction vessel equipped with a dropping funnel, a thermometer, a water-cooled reflux condenser, a stirrer, a temperature regulator and a nitrogen inlet tube, 240.0 g of polycarbonate polyol (DURANOL™ T5651, available from Asahi Kasei Chemicals), 89.1 g of HDI and 260.0 g of methyl ethyl ketone (MEK) were mixed. The mixture was heated to 75° C. and this temperature was kept for 3 hours.

Then, a mixed solution of 9.4 g of MEK, 13.4 g of DMPA and 10.1 g of triethylamine was added to the reaction vessel from the dropping funnel. The dropping funnel was rinsed with 8.0 g of MEK, and the temperature of the reaction vessel was increased to 75° C. and kept for 2 hours.

Then, the contents in the reaction vessel were cooled to 30° C., and 805.0 g of 4% TMP aqueous solution was dropped into the reaction vessel. The dropping funnel was rinsed with 60.0 g of ion exchanged water. After stirring the contents for 1 hour, the MEK was removed at 50° C. under reduced pressure to yield resin dispersion 11 containing about 30% by mass of resin solid. The THF-insoluble content in resin dispersion 11 was measured in the same manner as in the preparation of resin dispersion 1, and the result was 60% by mass.

Preparation of Resin Dispersion 12

In a reaction vessel equipped with a dropping funnel, a thermometer, a water-cooled reflux condenser, a stirrer, a temperature regulator and a nitrogen inlet tube, 240.0 g of polycarbonate polyol (DURANOL™ T5651, available from Asahi Kasei Chemicals), 89.1 g of HDI and 260.0 g of methyl ethyl ketone (MEK) were mixed. The mixture was heated to 75° C. and this temperature was kept for 3 hours.

Then, a mixed solution of 9.4 g of MEK, 13.4 g of DMPA and 10.1 g of triethylamine was added to the reaction vessel from the dropping funnel. The dropping funnel was rinsed with 8.0 g of MEK, and the temperature of the reaction vessel was increased to 75° C. and kept for 2 hours.

Then, the contents in the reaction vessel were cooled to 30° C., and 513.3 g of aqueous solution containing 1.5% of TMP and 7% of TEG was dropped into the reaction vessel. The dropping funnel was rinsed with 392.0 g of ion exchanged water. After stirring the contents for 1 hour, the MEK was removed at 50° C. under reduced pressure to yield resin dispersion 12 containing about 30% by mass of resin solid. The THF-insoluble content in resin dispersion 12 was measured in the same manner as in the preparation of resin dispersion 1, and the result was 55% by mass.

Preparation of Resin Dispersion 13

In a reaction vessel equipped with a dropping funnel, a thermometer, a water-cooled reflux condenser, a stirrer, a temperature regulator and a nitrogen inlet tube, 240.0 g of polycarbonate polyol (DURANOL™ T5651, available from Asahi Kasei Chemicals), 89.1 g of HDI and 260.0 g of methyl ethyl ketone (MEK) were mixed. The mixture was heated to 75° C. and this temperature was kept for 3 hours.

Then, a mixed solution of 9.4 g of MEK, 13.4 g of DMPA and 10.1 g of triethylamine was added to the reaction vessel from the dropping funnel. The dropping funnel was rinsed with 8.0 g of MEK, and the temperature of the reaction vessel was increased to 75° C. and kept for 2 hours.

Then, the contents in the reaction vessel were cooled to 30° C., and 827.5 g of 6% TMP aqueous solution was dropped into the reaction vessel. The dropping funnel was rinsed with 106.0 g of ion exchanged water. After stirring the contents for 1 hour, the MEK was removed at 50° C. under reduced pressure to yield resin dispersion 13 containing about 30% by mass of resin solid. The THF-insoluble content in resin dispersion 13 was measured in the same manner as in the preparation of resin dispersion 1, and the result was 69% by mass.

Preparation of Resin Dispersion 14

In a reaction vessel equipped with a dropping funnel, a thermometer, a water-cooled reflux condenser, a stirrer, a temperature regulator and a nitrogen inlet tube, 240.0 g of polycarbonate polyol (DURANOL™ T5651, available from Asahi Kasei Chemicals), 138.0 g of hydrogenated MDI (4,4'- dicyclohexylmethane diisocyanate) and 260.0 g of methyl ethyl ketone (MEK) were mixed. The mixture was heated to 75° C. and this temperature was kept for 3 hours.

Then, a mixed solution of 9.4 g of MEK, 13.4 g of DMPA and 10.1 g of triethylamine was added to the reaction vessel from the dropping funnel. The dropping funnel was rinsed with 8.0 g of MEK, and the temperature of the reaction vessel was increased to 75° C. and kept for 2 hours.

Then, the contents in the reaction vessel were cooled to 30° C., and 671.0 g of 4% TMP aqueous solution was dropped into the reaction vessel. The dropping funnel was rinsed with 300.5 g of ion exchanged water. After stirring the contents for 1 hour, the MEK was removed at 50° C. under reduced pressure to yield resin dispersion 14 containing about 30% by mass of resin solid. The THF-insoluble content in resin dispersion 14 was measured in the same manner as in the preparation of resin dispersion 1, and the result was 57% by mass.

Preparation of Resin Dispersion 15

In a reaction vessel equipped with a dropping funnel, a thermometer, a water-cooled reflux condenser, a stirrer, a temperature regulator and a nitrogen inlet tube, 240.0 g of polycarbonate polyol (DURANOL™ T5651, available from Asahi Kasei Chemicals), 89.1 g of HDI and 260.0 g of methyl ethyl ketone (MEK) were mixed. The mixture was heated to 75° C. and this temperature was kept for 3 hours.

Then, a mixed solution of 9.4 g of MEK, 13.4 g of DMPA and 10.1 g of triethylamine was added to the reaction vessel from the dropping funnel. The dropping funnel was rinsed with 8.0 g of MEK, and the temperature of the reaction vessel was increased to 75° C. and kept for 2 hours.

Then, the contents in the reaction vessel were cooled to 30° C., and 516.0 g of 4% diethylenetriamine (DETA) aqueous solution was dropped into the reaction vessel. The dropping funnel was rinsed with 320.7 g of ion exchanged water. After stirring the contents for 1 hour, the MEK was removed at 50° C. under reduced pressure to yield resin dispersion 15 containing about 30% by mass of resin solid. The THF-insoluble content in resin dispersion 15 was measured in the same manner as in the preparation of resin dispersion 1, and the result was 38% by mass.

Preparation of Resin Dispersion 16

In a reaction vessel equipped with a dropping funnel, a thermometer, a water-cooled reflux condenser, a stirrer, a temperature regulator and a nitrogen inlet tube, 240.0 g of polycarbonate polyol (DURANOL™ T5651, available from Asahi Kasei Chemicals), 89.1 g of HDI and 260.0 g of methyl ethyl ketone (MEK) were mixed. The mixture was heated to 75° C. and this temperature was kept for 3 hours.

Then, a mixed solution of 9.4 g of MEK, 13.4 g of DMPA and 10.1 g of triethylamine was added to the reaction vessel from the dropping funnel. The dropping funnel was rinsed with 8.0 g of MEK, and the temperature of the reaction vessel was increased to 75° C. and kept for 2 hours.

Then, the contents in the reaction vessel were cooled to 30° C., and the mixture of 97.5 g of 6.25% EDA aqueous solution and 29.7 g of 6.25% TETA aqueous solution was added into the reaction vessel. The dropping funnel was rinsed with 660.0 g of ion exchanged water. After stirring the contents for 1 hour, the MEK was removed at 50° C. under reduced pressure to yield resin dispersion 16 containing about 30% by mass of resin solid. The THF-insoluble content in resin dispersion 16 was measured in the same manner as in the preparation of resin dispersion 1, and the result was 40% by mass.

Preparation of Ink Jet Printing Ink

Tables 2, 4, 6, 8, 10, 12, 14 and 16 show the compositions of preferred ink jet recording inks. The ink jet recording inks according to embodiments of the invention were prepared by mixing the pigment dispersion and the resin dispersion with vehicle components shown in Tables 2, 4, 6, 8, 10, 12, 14 or 16. In the examples and comparative examples shown in the tables, the water as balance was ion exchanged water containing 0.05% of TOP SIDE 240 (manufactured by Permachem Asia) for preventing the decomposition of the ink, 0.02% of benzotriazole for preventing the corrosion of the ink jet head members, and 0.04% of ethylenediaminetetraacetic acid (EDTA) disodium salt for reducing the effect of the metal ions in the ink.

The values shown in Tables 2, 4, 6, 8, 10, 12, 14 and 16 are on the percent-by-mass basis. The pigment dispersion content (percent by mass, mass %) in the ink composition represents the concentration of the solid pigment, and the resin dispersion content (percent by mass, mass %) in the ink composition represents the concentration of the solid resin. S-104 represents Surfinol 104 produced by Nisshin Chemical Industry, and S-465 represents Surfinol 465 produced by Nisshin Chemical Industry. OH/NCO shown in Tables 1, 3, 5, 7, 9, 11, 13 and 15 represents the ratio of the number of OH groups of the formula (II) compound to the number of NCO groups of the polyisocyanate component of the resin.

Tests for Rub Fastness and Dry Cleaning Resistance

Test pieces were prepared using the above ink jet recording inks and a Seiko Epson ink jet printer PX-A650. The test pieces were prepared by performing solid printing on cotton cloths. For the rub fastness test, the test pieces were rubbed 100 times at a load of 200 g with a rubbing tester AB-301S manufacture by Tester Sangyo. The rub fastness was evaluated at two levels of dry and wet according to JIS L0849. The dry cleaning resistance was evaluated by method B of JIS L0860. The results of the rub fastness test and the dry cleaning resistance test are shown in Tables 1, 3, 5, 7, 9, 11, 13 and 15.

Ejection Stability Test

MSP Gothic 11-point characters (standard font size) were printed at a rate of 4000 characters per page on 100 pages of A4 paper XeroxP manufactured by Fuji Xerox at a temperature of 35° C. and a humidity of 35% using the above ink jet recording inks and a Seiko Epson ink jet printer PX-A650. The inks were evaluated in terms of the state of the printed characters. When characters were printed without being disordered, the ink composition was evaluated as AA; when printed characters were disordered at a point in the printed matter, the ink composition was evaluated as A; when printed characters were disordered at two or three points in the recorded matter, the ink composition was evaluated as B; when printed characters were disordered at four or five points in the printed matter, the ink composition was evaluated as C; when printed characters were disordered at 6 points or more in the printed matter, the ink composition was evaluated as D. The results are shown in Tables 1, 3, 5, 7, 9, 11, 13 and 15.

TABLE 1

|  | Example 1A | Example 2A | Example 3A | Comparative Example 1A | Comparative Example 2A | Comparative Example 3A | Comparative Example 4A | Comparative Example 5A |
| --- | --- | --- | --- | --- | --- | --- | --- | --- |
| Formula (I) compound | — | TEG | — | — | — | — | — | — |
| Formula (II) compound | TMP | TMP | TMP | — | — | — | — | — |

TABLE 1-continued

|  | Example 1A | Example 2A | Example 3A | Comparative Example 1A | Comparative Example 2A | Comparative Example 3A | Comparative Example 4A | Comparative Example 5A |
|---|---|---|---|---|---|---|---|---|
| Polyisocyanate | HDI | HDI | IPDI | IPDI | IPDI | IPDI | HDI | IPDI |
| Average particle size of carbon black dispersion (μm) | 180 | 180 | 180 | 180 | 180 | 180 | 180 | 180 |
| OH/NCO | 0.58 | 0.29 | 0.58 | 0 | 0 | 0 | 0 | 0 |
| THF-insoluble content in resin dispersant (mass %) | 60 | 53 | 55 | 8 | 5 | 39 | 5 | 14 |
| Rub fastness (dry) | 5 | 5 | 4/5 | 4 | 4 | 4 | 4 | 4 |
| Rub fastness (wet) | 4/5 | 4/5 | 4 | 2/3 | 2/3 | 2/3 | 2/3 | 2/3 |
| Dry cleaning property | 4/5 | 4/5 | 4/5 | 3 | 3 | 3 | 3/4 | 3 |
| Ejection stability | B | B | B | C | C | C | C | C |

TEG refers to triethylene glycol; TMP refers to trimethylolpropane; HDI refers to hexamethylene diisocyanate; and IPDI refers to isophorone diisocyanate.

TABLE 2

|  | Example 1A | Example 2A | Example 3A | Comparative Example 1A | Comparative Example 2A | Comparative Example 3A | Comparative Example 4A | Comparative Example 5A |
|---|---|---|---|---|---|---|---|---|
| Carbon black dispersion 1 | 4.25 | 4.25 | 4.25 | 4.25 | 4.25 | 4.25 | 4.25 | 4.25 |
| Resin dispersion 1 | 4.6 | — | — | — | — | — | — | — |
| Resin dispersion 2 | — | 4.6 | — | — | — | — | — | — |
| Resin dispersion 3 | — | — | 4.6 | — | — | — | — | — |
| Resin dispersion 4 | — | — | — | 4.6 | — | — | — | — |
| Resin dispersion 5 | — | — | — | — | 4.6 | — | — | — |
| Resin dispersion 6 | — | — | — | — | — | 4.6 | — | — |
| Resin dispersion 7 | — | — | — | — | — | — | 4.6 | — |
| Resin dispersion 8 | — | — | — | — | — | — | — | 4.6 |
| A-104 | 0.3 | 0.3 | 0.3 | 0.3 | 0.3 | 0.3 | 0.3 | 0.3 |
| S-465 | 0.5 | 0.5 | 0.5 | 0.5 | 0.5 | 0.5 | 0.5 | 0.5 |
| Glycerol | 14 | 14 | 14 | 14 | 14 | 14 | 14 | 14 |
| Ethylene glycol | 12 | 12 | 12 | 12 | 12 | 12 | 12 | 12 |
| Ion exchanged water | Balance | Balance | Balance | Balance | Balance | Balance | Balance | Balance |

TABLE 3

|  | Example 4A | Example 5A | Example 6A | Example 7A | Example 8A | Example 9A | Comparative Example 6A | Comparative Example 7A | Comparative Example 8A |
|---|---|---|---|---|---|---|---|---|---|
| Formula (I) compound | — | TEG | — | TEG | — | — | — | — | — |
| Formula (II) compound | TMP | — | TMP | TMP | TMP | TMP | — | — | TMP |
| Polyisocyanate | HDI | HDI | HDI | HDI | HDI | MDI | HDI | HDI | HDI |
| Average particle size of carbon black dispersion (μm) | 180 | 180 | 180 | 180 | 180 | 180 | 180 | 180 | 350 |
| OH/NCO | 0.57 | 0 | 0.68 | 0.16 | 1.05 | 0.57 | 0 | 0 | 0.57 |
| THF-insoluble content in resin dispersant (mass %) | 58 | 52 | 60 | 55 | 69 | 57 | 38 | 40 | 58 |
| Rub fastness (dry) | 5 | 5 | 5 | 5 | 4 | 4 | 4 | 4 | 4 |
| Rub fastness (wet) | 4/5 | 4/5 | 4/5 | 4/5 | 4 | 4 | 2/3 | 2/3 | 3 |
| Dry cleaning property | 4/5 | 4/5 | 4/5 | 4/5 | 4/5 | 4/5 | 3 | 3/4 | 4 |
| Ejection stability | A | A | A | A | B | A | C | B | D |

TEG refers to triethylene glycol; TMP refers to trimethylolpropane; HDI refers to hexamethylene diisocyanate; IPDI refers to isophorone diisocyanate; and MDI refers to 4,4'-dicyclohexylmethane diisocyanate.

TABLE 4

|  | Example 4A | Example 5A | Example 6A | Example 7A | Example 8A | Example 9A | Comparative Example 6A | Comparative Example 7A | Comparative Example 8A |
|---|---|---|---|---|---|---|---|---|---|
| Carbon black dispersion 1 | 4.65 | 4.65 | 4.65 | 4.65 | 4.65 | 4.65 | 4.65 | 4.65 | — |
| Carbon black dispersion 2 | — | — | — | — | — | — | — | — | 4.65 |
| Resin dispersion 9 | 6 | — | — | — | — | — | — | — | 6 |
| Resin dispersion 10 | — | 6 | — | — | — | — | — | — | — |
| Resin dispersion 11 | — | — | 6 | — | — | — | — | — | — |

TABLE 4-continued

|  | Example 4A | Example 5A | Example 6A | Example 7A | Example 8A | Example 9A | Comparative Example 6A | Comparative Example 7A | Comparative Example 8A |
|---|---|---|---|---|---|---|---|---|---|
| Resin dispersion 12 | — | — | — | 6 | — | — | — | — | — |
| Resin dispersion 13 | — | — | — | — | 6 | — | — | — | — |
| Resin dispersion 14 | — | — | — | — | — | 6 | — | — | — |
| Resin dispersion 15 | — | — | — | — | — | — | 6 | — | — |
| Resin dispersion 16 | — | — | — | — | — | — | — | 6 | — |
| 1,2-Hexanediol | 1 | 1 | 1 | 1 | 1 | 1 | 1 | 1 | 1 |
| Butyl triglycol | 1.5 | 1.5 | 1.5 | 1.5 | 1.5 | 1.5 | 1.5 | 1.5 | 1.5 |
| S-104 | 0.3 | 0.3 | 0.3 | 0.3 | 0.3 | 0.3 | 0.3 | 0.3 | 0.3 |
| S-465 | 0.5 | 0.5 | 0.5 | 0.5 | 0.5 | 0.5 | 0.5 | 0.5 | 0.5 |
| Glycerol | 8.5 | 8.5 | 8.5 | 8.5 | 8.5 | 8.5 | 8.5 | 8.5 | 8.5 |
| Trimethylolpropane | 3 | 3 | 3 | 3 | 3 | 3 | 3 | 3 | 3 |
| Triethylene glycol | 4 | 4 | 4 | 4 | 4 | 4 | 4 | 4 | 4 |
| Triethanolamine | 1 | 1 | 1 | 1 | 1 | 1 | 1 | 1 | 1 |
| Ion exchanged water | Balance | Balance | Balance | Balance | Balance | Balance | Balance | Balance | Balance |

TABLE 5

|  | Example 1B | Example 2B | Example 3B | Comparative Example 1B | Comparative Example 2B | Comparative Example 3B | Comparative Example 4B | Comparative Example 5B |
|---|---|---|---|---|---|---|---|---|
| Formula (I) compound | — | TEG | — | — | — | — | — | — |
| Formula (II) compound | TMP | TMP | TMP | — | — | — | — | — |
| Polyisocyanate | HDI | HDI | IPDI | IPDI | IPDI | IPDI | HDI | IPDI |
| Average particle size of pigment dispersion (nm) | 210 | 210 | 210 | 210 | 210 | 210 | 210 | 210 |
| OH/NCO | 0.58 | 0.29 | 0.58 | 0 | 0 | 0 | 0 | 0 |
| THF-insoluble content in resin dispersant (mass %) | 60 | 53 | 55 | 8 | 5 | 39 | 5 | 14 |
| Rub fastness (dry) | 5 | 5 | 4/5 | 4 | 4 | 4 | 4 | 4 |
| Rub fastness (wet) | 5 | 4/5 | 4 | 2/3 | 2/3 | 2/3 | 3 | 2/3 |
| Dry cleaning property | 4/5 | 4/5 | 4/5 | 3 | 3 | 3 | 3/4 | 3 |
| Ejection stability | B | B | B | C | C | C | C | C |

TEG refers to triethylene glycol; TMP refers to trimethylolpropane; HDI refers to hexamethylene diisocyanate; and IPDI refers to isophorone diisocyanate.

TABLE 6

|  | Example 1B | Example 2B | Example 3B | Comparative Example 1B | Comparative Example 2B | Comparative Example 3B | Comparative Example 4B | Comparative Example 5B |
|---|---|---|---|---|---|---|---|---|
| Red pigment dispersion | 4.25 | 4.25 | 4.25 | 4.25 | 4.25 | 4.25 | 4.25 | 4.25 |
| Resin dispersion 1 | 6.4 | — | — | — | — | — | — | — |
| Resin dispersion 2 | — | 6.4 | — | — | — | — | — | — |
| Resin dispersion 3 | — | — | 6.4 | — | — | — | — | — |
| Resin dispersion 4 | — | — | — | 6.4 | — | — | — | — |
| Resin dispersion 5 | — | — | — | — | 6.4 | — | — | — |
| Resin dispersion 6 | — | — | — | — | — | 6.4 | — | — |
| Resin dispersion 7 | — | — | — | — | — | — | 6.4 | — |
| Resin dispersion 8 | — | — | — | — | — | — | — | 6.4 |
| S-104 | 0.4 | 0.4 | 0.4 | 0.4 | 0.4 | 0.4 | 0.4 | 0.4 |
| S-465 | 0.5 | 0.5 | 0.5 | 0.5 | 0.5 | 0.5 | 0.5 | 0.5 |
| 1-Methoxy-2-propanol | 10 | 10 | 10 | 10 | 10 | 10 | 10 | 10 |
| Glycerol | 5 | 5 | 5 | 5 | 5 | 5 | 5 | 5 |
| Ethylene glycol | 5 | 5 | 5 | 5 | 5 | 5 | 5 | 5 |
| Ion exchanged water | Balance | Balance | Balance | Balance | Balance | Balance | Balance | Balance |

TABLE 7

|  | Example 4B | Example 5B | Example 6B | Example 7B | Example 8B | Example 9B | Comparative Example 6B | Comparative Example 7B | Comparative Example 8B |
|---|---|---|---|---|---|---|---|---|---|
| Formula (I) compound | — | TEG | — | TEG | — | — | — | — | — |
| Formula (II) compound | TMP | — | TMP | TMP | TMP | TMP | — | — | TMP |
| Polyisocyanate | HDI | HDI | HDI | HDI | HDI | MDI | HDI | HDI | HDI |
| Average particle size of pigment dispersion (nm) | 150 | 150 | 150 | 150 | 150 | 150 | 150 | 150 | 350 |
| OH/NCO | 0.57 | 0 | 0.68 | 0.16 | 1.05 | 0.57 | 0 | 0 | 0.57 |

TABLE 7-continued

|  | Example 4B | Example 5B | Example 6B | Example 7B | Example 8B | Example 9B | Comparative Example 6B | Comparative Example 7B | Comparative Example 8B |
|---|---|---|---|---|---|---|---|---|---|
| THF-insoluble content in resin dispersant (mass %) | 58 | 52 | 60 | 55 | 69 | 57 | 38 | 40 | 58 |
| Rub fastness (dry) | 5 | 5 | 5 | 5 | 4 | 4 | 4 | 4 | 4 |
| Rub fastness (wet) | 5 | 5 | 4/5 | 4/5 | 4 | 4 | 2/3 | 3 | 3 |
| Dry cleaning property | 4/5 | 4/5 | 4/5 | 4/5 | 4/5 | 4/5 | 3/4 | 3/4 | 4 |
| Ejection stability | A | A | A | A | B | A | B | B | D |

TEG refers to triethylene glycol; TMP refers to trimethylolpropane; HDI refers to hexamethylene diisocyanate; IPDI refers to isophorone diisocyanate; and MDI refers to 4,4'-dicyclohexylmethane diisocyanate.

TABLE 8

|  | Example 4B | Example 5B | Example 6B | Example 7B | Example 8B | Example 9B | Comparative Example 6B | Comparative Example 7B | Comparative Example 8B |
|---|---|---|---|---|---|---|---|---|---|
| Cyan pigment dispersion 1 | 4 | 4 | 4 | 4 | 4 | 4 | 4 | 4 | — |
| Cyan pigment dispersion 2 | — | — | — | — | — | — | — | — | 4 |
| Resin dispersion 9 | 6.8 | — | — | — | — | — | — | — | 6.8 |
| Resin dispersion 10 | — | 6.8 | — | — | — | — | — | — | — |
| Resin dispersion 11 | — | — | 6.8 | — | — | — | — | — | — |
| Resin dispersion 12 | — | — | — | 6.8 | — | — | — | — | — |
| Resin dispersion 13 | — | — | — | — | 6.8 | — | — | — | — |
| Resin dispersion 14 | — | — | — | — | — | 6.8 | — | — | — |
| Resin dispersion 15 | — | — | — | — | — | — | 6.8 | — | — |
| Resin dispersion 16 | — | — | — | — | — | — | — | 6.8 | — |
| 1,2-Hexanediol | 0.5 | 0.5 | 0.5 | 0.5 | 0.5 | 0.5 | 0.5 | 0.5 | 0.5 |
| Butyl triglycol | 1.5 | 1.5 | 1.5 | 1.5 | 1.5 | 1.5 | 1.5 | 1.5 | 1.5 |
| S-104 | 0.3 | 0.3 | 0.3 | 0.3 | 0.3 | 0.3 | 0.3 | 0.3 | 0.3 |
| S-465 | 0.5 | 0.5 | 0.5 | 0.5 | 0.5 | 0.5 | 0.5 | 0.5 | 0.5 |
| Glycerol | 9 | 9 | 9 | 9 | 9 | 9 | 9 | 9 | 9 |
| Trimethylolpropane | 3 | 3 | 3 | 3 | 3 | 3 | 3 | 3 | 3 |
| Triethylene glycol | 4 | 4 | 4 | 4 | 4 | 4 | 4 | 4 | 4 |
| Triethanolamine | 1 | 1 | 1 | 1 | 1 | 1 | 1 | 1 | 1 |
| Ion exchanged water | Balance | Balance | Balance | Balance | Balance | Balance | Balance | Balance | Balance |

TABLE 9

|  | Example 1C | Example 2C | Example 3C | Comparative Example 1C | Comparative Example 2C | Comparative Example 3C | Comparative Example 4C | Comparative Example 5C |
|---|---|---|---|---|---|---|---|---|
| Formula (I) compound | — | TEG | — | — | — | — | — | — |
| Formula (II) compound | TMP | TMP | TMP | — | — | — | — | — |
| Polyisocyanate | HDI | HDI | IPDI | IPDI | IPDI | IPDI | HDI | IPDI |
| Average particle size of pigment dispersion (nm) | 180 | 180 | 210 | 180 | 180 | 180 | 180 | 210 |
| OH/NCO | 0.58 | 0.29 | 0.58 | 0 | 0 | 0 | 0 | 0 |
| THF-insoluble content in resin dispersant (mass %) | 60 | 53 | 55 | 8 | 5 | 39 | 5 | 14 |
| Rub fastness (dry) | 5 | 5 | 4/5 | 4 | 4 | 4 | 4 | 4 |
| Rub fastness (wet) | 4/5 | 4/5 | 4 | 2/3 | 2/3 | 2/3 | 2/3 | 2/3 |
| Dry cleaning property | 4/5 | 4/5 | 4/5 | 3 | 3 | 3 | 3/4 | 3 |
| Ejection stability | B | B | B | C | C | C | C | C |

TEG refers to triethylene glycol; TMP refers to trimethylolpropane; HDI refers to hexamethylene diisocyanate; and IPDI refers to isophorone diisocyanate.

TABLE 10

|  | Example 1C | Example 2C | Example 3C | Comparative Example 1C | Comparative Example 2C | Comparative Example 3C | Comparative Example 4C | Comparative Example 5C |
|---|---|---|---|---|---|---|---|---|
| Carbon black dispersion 1 | 4.25 | 4.25 | — | 4.25 | 4.25 | 4.25 | 4.25 | — |
| Red pigment dispersion | — | — | 4.25 | — | — | — | — | 4.25 |
| Resin dispersion 1 | 4.6 | — | — | — | — | — | — | — |
| Resin dispersion 2 | — | 4.6 | — | — | — | — | — | — |
| Resin dispersion 3 | — | — | 6.4 | — | — | — | — | — |
| Resin dispersion 4 | — | — | — | 4.6 | — | — | — | — |
| Resin dispersion 5 | — | — | — | — | 4.6 | — | — | — |
| Resin dispersion 6 | — | — | — | — | — | 4.6 | — | — |
| Resin dispersion 7 | — | — | — | — | — | — | 4.6 | — |
| Resin dispersion 8 | — | — | — | — | — | — | — | 6.4 |
| S-104 | 0.3 | 0.3 | 0.4 | 0.3 | 0.3 | 0.3 | 0.3 | 0.4 |
| S-465 | 0.5 | 0.5 | 0.5 | 0.5 | 0.5 | 0.5 | 0.5 | 0.5 |
| 1-Methoxy-2-propanol | — | — | 10 | — | — | — | — | 10 |
| Glycerol | 14 | 14 | 5 | 14 | 14 | 14 | 14 | 5 |
| Ethylene glycol | 12 | 12 | 5 | 12 | 12 | 12 | 12 | 5 |
| Ion exchanged water | Balance | Balance | Balance | Balance | Balance | Balance | Balance | Balance |

TABLE 11

|  | Example 4C | Example 5C | Example 6C | Example 7C | Example 8C | Example 9C | Comparative Example 6C | Comparative Example 7C | Comparative Example 8C |
|---|---|---|---|---|---|---|---|---|---|
| Formula (I) compound | — | TEG | — | TEG | TEG | — | — | — | — |
| Formula (II) compound | TMP | — | TMP | TMP | TMP | TMP | — | — | TMP |
| Polyisocyanate | HDI | HDI | HDI | HDI | HDI | MDI | HDI | HDI | HDI |
| Average particle size of pigment dispersion (nm) | 150 | 80 | 180 | 180 | 150 | 80 | 150 | 180 | 330 |
| OH/NCO | 0.57 | 0 | 0.68 | 0.16 | 1.05 | 0.57 | 0 | 0 | 0.57 |
| THF-insoluble content in resin dispersant (mass %) | 58 | 52 | 60 | 55 | 69 | 57 | 38 | 40 | 58 |
| Rub fastness (dry) | 5 | 5 | 5 | 5 | 4 | 4 | 4 | 4 | 4 |
| Rub fastness (wet) | 5 | 5 | 5 | 4/5 | 4 | 4 | 2/3 | 2/3 | 3 |
| Dry cleaning property | 4/5 | 4/5 | 4/5 | 4/5 | 4/5 | 4/5 | 3/4 | 3/4 | 4 |
| Ejection stability | A | A | A | A | B | A | B | B | D |

TEG refers to triethylene glycol; TMP refers to trimethylolpropane; HDI refers to hexamethylene diisocyanate; IPDI refers to isophorone diisocyanate; and MDI refers to 4,4'-dicyclohexylmethane diisocyanate.

TABLE 12

|  | Example 4C | Example 5C | Example 6C | Example 7C | Example 8C | Example 9C | Comparative Example 6C | Comparative Example 7C | Comparative Example 8C |
|---|---|---|---|---|---|---|---|---|---|
| Carbon black dispersion 1 | — | — | 4.65 | 4.65 | — | — | — | 4.65 | — |
| Cyan pigment dispersion 1 | 4 | — | — | — | 4 | — | 4 | — | — |
| Cyan pigment dispersion 3 | — | 4 | — | — | — | 4 | — | — | — |
| Cyan pigment dispersion 4 | — | — | — | — | — | — | — | — | 4 |
| Resin dispersion 9 | 6.8 | — | — | — | — | — | — | — | 6.8 |
| Resin dispersion 10 | — | 6 | — | — | — | — | — | — | — |
| Resin dispersion 11 | — | — | 6 | — | — | — | — | — | — |
| Resin dispersion 12 | — | — | — | 6 | — | — | — | — | — |
| Resin dispersion 13 | — | — | — | — | 6.8 | — | — | — | — |
| Resin dispersion 14 | — | — | — | — | — | 6 | — | — | — |
| Resin dispersion 15 | — | — | — | — | — | — | 6.8 | — | — |
| Resin dispersion 16 | — | — | — | — | — | — | — | 6 | — |
| 1,2-Hexanediol | 0.5 | 0.5 | 1 | 1 | 0.5 | 0.5 | 0.5 | 1 | 0.5 |
| Butyl triglycol | 1.5 | 1.5 | 1.5 | 1.5 | 1.5 | 1.5 | 1.5 | 1.5 | 1.5 |
| S-104 | 0.3 | 0.3 | 0.3 | 0.3 | 0.3 | 0.3 | 0.3 | 0.3 | 0.3 |
| S-465 | 0.5 | 0.5 | 0.5 | 0.5 | 0.5 | 0.5 | 0.5 | 0.5 | 0.5 |
| Glycerol | 9 | 10.5 | 8.5 | 8.5 | 9 | 10.5 | 9 | 8.5 | 9 |
| Trimethylolpropane | 3 | 3 | 3 | 3 | 3 | 3 | 3 | 3 | 3 |
| Triethylene glycol | 4 | 4 | 4 | 4 | 4 | 4 | 4 | 4 | 4 |
| Triethanolamine | 1 | 1 | 1 | 1 | 1 | 1 | 1 | 1 | 1 |
| Ion exchange water | Balance | Balance | Balance | Balance | Balance | Balance | Balance | Balance | Balance |

TABLE 13

| | Example 1D | Example 2D | Example 3D | Comparative Example 1D | Comparative Example 2D | Comparative Example 3D | Comparative Example 4D | Comparative Example 5D |
|---|---|---|---|---|---|---|---|---|
| Formula (I) compound | — | TEG | — | — | — | — | — | — |
| Formula (II) compound | TMP | TMP | TMP | — | — | — | — | — |
| Polyisocyanate | HDI | HDI | IPDI | IPDI | IPDI | IPDI | HDI | IPDI |
| Average particle size of pigment dispersion (nm) | 70 | 70 | 70 | 70 | 70 | 70 | 70 | 70 |
| OH/NCO | 0.58 | 0.29 | 0.58 | 0 | 0 | 0 | 0 | 0 |
| THF-insoluble content in resin dispersant (mass %) | 60 | 53 | 55 | 8 | 5 | 39 | 5 | 14 |
| Rub fastness (dry) | 5 | 5 | 4/5 | 4 | 4 | 4 | 4 | 4 |
| Rub fastness (wet) | 5 | 5 | 4/5 | 2/3 | 2/3 | 3 | 3/4 | 2/3 |
| Dry cleaning property | 4/5 | 4/5 | 4/5 | 3 | 3 | 3/4 | 3/4 | 3 |
| Ejection stability | B | B | B | C | C | C | C | C |

TEG refers to triethylene glycol; TMP refers to trimethylolpropane; HDI refers to hexamethylene diisocyanate; and IPDI refers to isophorone diisocyanate.

TABLE 14

| | Example 1D | Example 2D | Example 3D | Comparative Example 1D | Comparative Example 2D | Comparative Example 3D | Comparative Example 4D | Comparative Example 5D |
|---|---|---|---|---|---|---|---|---|
| Magenta pigment dispersion | 4.25 | 4.25 | 4.25 | 4.25 | 4.25 | 4.25 | 4.25 | 4.25 |
| Resin dispersion 1 | 6.4 | — | — | — | — | — | — | — |
| Resin dispersion 2 | — | 6.4 | — | — | — | — | — | — |
| Resin dispersion 3 | — | — | 6.4 | — | — | — | — | — |
| Resin dispersion 4 | — | — | — | 6.4 | — | — | — | — |
| Resin dispersion 5 | — | — | — | — | 6.4 | — | — | — |
| Resin dispersion 6 | — | — | — | — | — | 6.4 | — | — |
| Resin dispersion 7 | — | — | — | — | — | — | 6.4 | — |
| Resin dispersion 8 | — | — | — | — | — | — | — | 6.4 |
| S-104 | 0.4 | 0.4 | 0.4 | 0.4 | 0.4 | 0.4 | 0.4 | 0.4 |
| S-465 | 0.5 | 0.5 | 0.5 | 0.5 | 0.5 | 0.5 | 0.5 | 0.5 |
| 1-Methoxy-2-propanol | 10 | 10 | 10 | 10 | 10 | 10 | 10 | 10 |
| Glycerol | 5 | 5 | 5 | 5 | 5 | 5 | 5 | 5 |
| Ethylene glycol | 5 | 5 | 5 | 5 | 5 | 5 | 5 | 5 |
| Ion exchange water | Balance | Balance | Balance | Balance | Balance | Balance | Balance | Balance |

TABLE 15

| | Example 4D | Example 5D | Example 6D | Example 7D | Example 8D | Example 9D | Comparative Example 6D | Comparative Example 7D | Comparative Example 8D |
|---|---|---|---|---|---|---|---|---|---|
| Formula (I) compound | — | TEG | — | TEG | — | — | — | — | — |
| Formula (II) compound | TMP | — | TMP | TMP | TMP | TMP | — | — | TMP |
| Polyisocyanate | HDI | HDI | HDI | HDI | HDI | MDI | HDI | HDI | HDI |
| Average particle size of pigment dispersion (nm) | 80 | 80 | 80 | 80 | 80 | 80 | 80 | 80 | 330 |
| OH/NCO | 0.57 | 0 | 0.68 | 0.16 | 1.05 | 0.57 | 0 | 0 | 0.57 |
| THF-insoluble content in resin dispersant (mass %) | 58 | 52 | 60 | 55 | 69 | 57 | 38 | 40 | 58 |
| Rub fastness (dry) | 5 | 5 | 5 | 5 | 4 | 4 | 4 | 4 | 4 |
| Rub fastness (wet) | 5 | 5 | 4/5 | 4/5 | 4 | 4 | 2/3 | 3 | 3 |
| Dry cleaning property | 4/5 | 4/5 | 4/5 | 4/5 | 4/5 | 4/5 | 3/4 | 3/4 | 4 |
| Ejection stability | A | A | A | A | B | A | B | B | D |

TEG refers to triethylene glycol; TMP refers to trimethylolpropane; HDI refers to hexamethylene diisocyanate; IPDI refers to isophorone diisocyanate; and MDI refers to 4,4'-dicyclohexylmethane diisocyanate.

TABLE 16

|  | Example 4D | Example 5D | Example 6D | Example 7D | Example 8D | Example 9D | Comparative Example 6D | Comparative Example 7D | Comparative Example 8D |
|---|---|---|---|---|---|---|---|---|---|
| Cyan pigment dispersion 3 | 4 | 4 | 4 | 4 | 4 | 4 | 4 | 4 | — |
| Cyan pigment dispersion 4 | — | — | — | — | — | — | — | — | 4 |
| Resin dispersion 9 | 6 | — | — | — | — | — | — | — | 6 |
| Resin dispersion 10 | — | 6 | — | — | — | — | — | — | — |
| Resin dispersion 11 | — | — | 6 | — | — | — | — | — | — |
| Resin dispersion 12 | — | — | — | 6 | — | — | — | — | — |
| Resin dispersion 13 | — | — | — | — | 6 | — | — | — | — |
| Resin dispersion 14 | — | — | — | — | — | 6 | — | — | — |
| Resin dispersion 15 | — | — | — | — | — | — | 6 | — | — |
| Resin dispersion 16 | — | — | — | — | — | — | — | 6 | — |
| 1,2-Hexanediol | 0.5 | 0.5 | 0.5 | 0.5 | 0.5 | 0.5 | 0.5 | 0.5 | 0.5 |
| Butyl triglycol | 1.5 | 1.5 | 1.5 | 1.5 | 1.5 | 1.5 | 1.5 | 1.5 | 1.5 |
| S-104 | 0.3 | 0.3 | 0.3 | 0.3 | 0.3 | 0.3 | 0.3 | 0.3 | 0.3 |
| S-465 | 0.5 | 0.5 | 0.5 | 0.5 | 0.5 | 0.5 | 0.5 | 0.5 | 0.5 |
| Glycerol | 10.5 | 10.5 | 10.5 | 10.5 | 10.5 | 10.5 | 10.5 | 10.5 | 10.5 |
| Trimethylolpropane | 3 | 3 | 3 | 3 | 3 | 3 | 3 | 3 | 3 |
| Triethylene glycol | 4 | 4 | 4 | 4 | 4 | 4 | 4 | 4 | 4 |
| Triethanolamine | 1 | 1 | 1 | 1 | 1 | 1 | 1 | 1 | 1 |
| Ion exchanged water | Balance | Balance | Balance | Balance | Balance | Balance | Balance | Balance | Balance |

What is claimed is:

1. An ink jet recording ink composition comprising:
   a dispersion containing a pigment dispersible in water, the dispersion having an average particle size in the range of 20 to 300 nm;
   water; and
   a polyurethane resin dispersion containing a compound expressed by formula (I) and a compound expressed by formula (II):

$$HO-(CH_2CH_2O)_N-H \quad (I)$$

wherein N represents an integer in the range of 1 to 6,

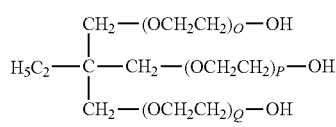

(II)

wherein O+P+Q is an integer in the range of 0 to 6.

2. The ink jet recording ink composition according to claim 1, wherein the polyurethane resin dispersion contains 50% by mass or more of THF-insoluble portion.

3. The ink jet recording ink composition according to claim 1, wherein the polyurethane resin dispersion contains a polyisocyanate component having an NCO group, and the ratio of the number of the OH groups of the compound expressed by formula (II) to the number of NCO groups of the polyisocyanate component is 0.75 or less.

4. The ink jet recording ink composition according to claim 1, wherein the polyurethane resin dispersion contains a polyisocyanate component containing a compound expressed by formula (III):

$$OCN-(CH_2)_L-NCO \quad (III)$$

wherein L represents an integer in the range of 3 to 10.

5. The ink jet recording ink composition according to claim 1, wherein the polyurethane resin contains a polyol component expressed by formula (IV):

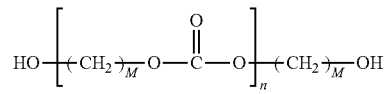

wherein M represents an integer in the range of 3 to 10, and n represents an integer in the range of 2 to 14.

6. The ink jet recording ink composition according to claim 1, wherein the dispersion contains a self-dispersing pigment.

7. The ink jet recording ink composition according to claim 1, wherein the dispersion contains a pigment that is dispersed by a macromolecular compound.

8. The ink jet recording ink composition according to claim 1, wherein the dispersion contains a pigment that is coated with a polymer.

9. The ink jet recording ink composition according to claim 1, further comprising a 1,2-alkylene glycol.

10. The ink jet recording ink composition according to claim 1, further comprising at least one of an acetylene glycol surfactant and an acetylene alcohol surfactant.

11. The ink jet recording ink composition according to claim 1, wherein the ink jet recording ink composition is used for ink jet textile printing.

12. A method for ink jet textile printing, the method using the ink jet recording ink composition as set forth in claim 1.

* * * * *